United States Patent
Ott

(10) Patent No.: US 9,470,869 B2
(45) Date of Patent: Oct. 18, 2016

(54) RAPID DEPLOYMENT PACKAGING FOR OPTICAL FIBER

(71) Applicant: ADC Telecommunications, Inc., Berwyn, PA (US)

(72) Inventor: Michael James Ott, Hudson, WI (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/861,779

(22) Filed: Sep. 22, 2015

(65) Prior Publication Data

US 2016/0109675 A1    Apr. 21, 2016

Related U.S. Application Data

(62) Division of application No. 14/038,066, filed on Sep. 26, 2013, now Pat. No. 9,146,374.

(60) Provisional application No. 61/707,517, filed on Sep. 28, 2012.

(51) Int. Cl.
    *G02B 6/00*     (2006.01)
    *G02B 6/44*     (2006.01)
    *G02B 6/38*     (2006.01)

(52) U.S. Cl.
    CPC ........... *G02B 6/4457* (2013.01); *G02B 6/3897* (2013.01); *G02B 6/4455* (2013.01); *G02B 6/4465* (2013.01); *G02B 6/4471* (2013.01); *G02B 6/4453* (2013.01); *Y10T 29/49826* (2015.01)

(58) Field of Classification Search
    USPC ......................................................... 385/135
    See application file for complete search history.

(56) References Cited

U.S. PATENT DOCUMENTS 4,359,262 A   11/1982   Dolan
4,502,754 A    3/1985   Kawa (Continued)

FOREIGN PATENT DOCUMENTS

AU        40995/85        4/1985
AU        55314/86        3/1986

(Continued)

OTHER PUBLICATIONS 21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.

(Continued)

*Primary Examiner* — Eric Wong
(74) *Attorney, Agent, or Firm* — Merchant & Gould P.C.

(57) ABSTRACT

A packaging arrangement for telecommunications cabling is disclosed herein. The packaging arrangement includes a modular spool assembly defined by a first flange, an opposing second flange, and a spool hub separating the first flange from the second flange, wherein a telecommunications cable may be wound between the first and second flanges. Each flange defines a first cable contact side, a second cable-end storage side, and an opening allowing the telecommunications cable to pass from the first side to the second side, the second side defining a storage compartment for storing an end of the telecommunications cable passing through the opening in the flange.

10 Claims, 12 Drawing Sheets

(56) References Cited

U.S. PATENT DOCUMENTS

| | | |
|---|---|---|
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,733,936 A | 3/1988 | Mikolaicyk et al. |
| 4,736,100 A | 4/1988 | Vastagh |
| 4,747,020 A | 5/1988 | Brickley et al. |
| 4,765,710 A | 8/1988 | Burneister et al. |
| 4,792,203 A | 12/1988 | Nelson et al. |
| 4,824,196 A | 4/1989 | Bylander |
| 4,861,134 A | 8/1989 | Alameel et al. |
| 4,900,123 A | 2/1990 | Barlow et al. |
| 4,948,220 A | 8/1990 | Violo et al. |
| 4,971,421 A | 11/1990 | Ori |
| 4,986,762 A | 1/1991 | Keith |
| 4,995,688 A | 2/1991 | Anton et al. |
| 5,011,257 A | 4/1991 | Wettengel et al. |
| 5,023,646 A | 6/1991 | Ishida et al. |
| 5,058,983 A | 10/1991 | Corke et al. |
| 5,067,784 A | 11/1991 | Debortoli et al. |
| 5,071,211 A | 12/1991 | Debortoli et al. |
| 5,073,042 A | 12/1991 | Mulholland et al. |
| 5,076,688 A | 12/1991 | Bowen et al. |
| 5,100,221 A | 3/1992 | Carney et al. |
| 5,109,447 A | 4/1992 | Chan |
| 5,127,082 A | 6/1992 | Below et al. |
| 5,129,030 A | 7/1992 | Petrunia |
| 5,138,688 A | 8/1992 | Debortoli |
| 5,142,598 A | 8/1992 | Tabone |
| 5,142,606 A | 8/1992 | Carney et al. |
| 5,155,785 A | 10/1992 | Holland et al. |
| 5,160,188 A | 11/1992 | Rorke et al. |
| 5,167,001 A | 11/1992 | Debortoli et al. |
| 5,179,618 A | 1/1993 | Anton |
| 5,208,885 A | 5/1993 | Dragone et al. |
| 5,212,761 A | 5/1993 | Petrunia |
| 5,214,735 A | 5/1993 | Henneberger et al. |
| 5,233,674 A | 8/1993 | Vladic |
| 5,235,665 A | 8/1993 | Marchesi et al. |
| 5,259,051 A | 11/1993 | Burack et al. |
| 5,274,729 A | 12/1993 | King et al. |
| 5,274,731 A | 12/1993 | White |
| 5,287,425 A | 2/1994 | Chang |
| 5,289,558 A | 2/1994 | Teichler et al. |
| 5,317,663 A | 5/1994 | Beard et al. |
| 5,318,259 A | 6/1994 | Fussler |
| 5,333,221 A | 7/1994 | Briggs et al. |
| 5,333,222 A | 7/1994 | Belenkiy et al. |
| 5,335,349 A | 8/1994 | Kutsch et al. |
| 5,353,367 A | 10/1994 | Czosnowski et al. |
| 5,359,688 A | 10/1994 | Underwood |
| 5,363,440 A | 11/1994 | Daoud |
| 5,363,465 A | 11/1994 | Korkowski et al. |
| 5,363,467 A | 11/1994 | Keith |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,420,958 A | 5/1995 | Henson et al. |
| 5,430,823 A | 7/1995 | Dupont et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,461,690 A | 10/1995 | Lampert |
| 5,469,526 A | 11/1995 | Rawlings |
| 5,490,229 A | 2/1996 | Ghandeharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,542,015 A | 7/1996 | Hultermans |
| 5,570,450 A | 10/1996 | Fernandez et al. |
| 5,613,030 A | 3/1997 | Hoffer et al. |
| 5,636,138 A | 6/1997 | Gilbert et al. |
| 5,647,043 A | 7/1997 | Anderson et al. |
| 5,655,044 A | 8/1997 | Finzel et al. |
| 5,689,604 A | 11/1997 | Janus et al. |
| 5,708,751 A | 1/1998 | Mattei |
| 5,715,348 A | 2/1998 | Falkenberg et al. |
| 5,717,810 A | 2/1998 | Wheeler |
| 5,734,776 A | 3/1998 | Puetz |
| 5,742,480 A | 4/1998 | Sawada et al. |
| 5,758,002 A | 5/1998 | Walters |
| 5,758,003 A | 5/1998 | Wheeler et al. |
| 5,764,844 A | 6/1998 | Mendes |
| 5,774,245 A | 6/1998 | Baker |
| 5,774,612 A | 6/1998 | Belenkiy et al. |
| 5,781,686 A | 7/1998 | Robinson et al. |
| 5,784,515 A | 7/1998 | Tamaru et al. |
| 5,823,646 A | 10/1998 | Arizpe et al. |
| 5,825,955 A | 10/1998 | Ernst et al. |
| 5,841,917 A | 11/1998 | Jungerman et al. |
| 5,870,519 A | 2/1999 | Jenkins et al. |
| 5,883,995 A | 3/1999 | Lu |
| 5,887,095 A | 3/1999 | Nagase et al. |
| 5,889,910 A | 3/1999 | Igl et al. |
| 5,903,698 A | 5/1999 | Poremba et al. |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,966,492 A | 10/1999 | Bechamps et al. |
| 5,969,294 A | 10/1999 | Eberle et al. |
| 5,971,626 A | 10/1999 | Knodell et al. |
| 5,975,769 A | 11/1999 | Larson et al. |
| 5,987,203 A | 11/1999 | Abel et al. |
| 6,005,991 A | 12/1999 | Knasel |
| 6,012,852 A | 1/2000 | Kadar-Kallen et al. |
| 6,022,150 A | 2/2000 | Erdman et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,076,975 A | 6/2000 | Roth |
| 6,079,881 A | 6/2000 | Roth |
| 6,097,872 A | 8/2000 | Kusuda et al. |
| 6,149,315 A | 11/2000 | Stephenson |
| 6,160,946 A | 12/2000 | Thompson et al. |
| 6,167,183 A | 12/2000 | Swain |
| 6,181,845 B1 | 1/2001 | Horsthuis et al. |
| 6,188,687 B1 | 2/2001 | Mussman et al. |
| 6,188,825 B1 | 2/2001 | Bandy et al. |
| 6,208,779 B1 | 3/2001 | Rowlette, Sr. et al. |
| 6,208,796 B1 | 3/2001 | Vigliaturo |
| 6,215,938 B1 | 4/2001 | Reitmeier et al. |
| 6,222,976 B1 | 4/2001 | Shahid |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,256,443 B1 | 7/2001 | Uruno |
| 6,269,214 B1 | 7/2001 | Naudin et al. |
| 6,271,484 B1 | 8/2001 | Tokutsu |
| 6,278,829 B1 | 8/2001 | BuAbbud et al. |
| 6,304,690 B1 | 10/2001 | Day |
| RE37,489 E | 1/2002 | Anton et al. |
| 6,347,888 B1 | 2/2002 | Puetz |
| 6,351,590 B1 | 2/2002 | Shahid |
| 6,352,374 B1 | 3/2002 | Selfridge et al. |
| 6,356,697 B1 | 3/2002 | Braga et al. |
| 6,360,050 B1 | 3/2002 | Moua et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |

(56) References Cited

U.S. PATENT DOCUMENTS

| | | |
|---|---|---|
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,661 B2 | 11/2002 | Kadar-Kallen et al. |
| 6,483,977 B2 | 11/2002 | Battey et al. |
| 6,493,480 B1 | 12/2002 | Lelic |
| 6,496,638 B1 | 12/2002 | Andersen |
| 6,496,640 B1 | 12/2002 | Harvey et al. |
| 6,504,988 B1 | 1/2003 | Trebesch et al. |
| 6,510,273 B2 | 1/2003 | Ali et al. |
| 6,526,210 B1 | 2/2003 | Harrison et al. |
| 6,532,332 B2 | 3/2003 | Solheid et al. |
| 6,535,682 B1 | 3/2003 | Puetz et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,556,763 B1 | 4/2003 | Puetz et al. |
| 6,573,451 B2 | 6/2003 | Komiya et al. |
| 6,577,595 B1 | 6/2003 | Counterman |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,600,866 B2 | 7/2003 | Gatica et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| RE38,311 E | 11/2003 | Wheeler |
| 6,648,376 B2 | 11/2003 | Christianson |
| 6,654,536 B2 | 11/2003 | Battey et al. |
| 6,661,961 B1 | 12/2003 | Allen et al. |
| 6,668,127 B1 | 12/2003 | Mahony |
| 6,688,780 B2 | 2/2004 | Duran |
| 6,690,862 B1 | 2/2004 | Rietveld |
| 6,709,607 B2 | 3/2004 | Hibbs-Brenner et al. |
| 6,711,339 B2 | 3/2004 | Puetz et al. |
| 6,736,670 B2 | 5/2004 | Clark et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,761,585 B2 | 7/2004 | Clark et al. |
| 6,763,166 B2 | 7/2004 | Yow, Jr. et al. |
| 6,764,221 B1 | 7/2004 | de Jong et al. |
| 6,768,860 B2 | 7/2004 | Liberty |
| 6,775,458 B2 | 8/2004 | Yow, Jr. et al. |
| 6,778,752 B2 | 8/2004 | Laporte et al. |
| 6,788,786 B1 | 9/2004 | Kessler et al. |
| 6,788,846 B2 | 9/2004 | Hileman et al. |
| 6,792,190 B2 | 9/2004 | Xin et al. |
| 6,792,191 B1 | 9/2004 | Clapp, Jr. et al. |
| 6,793,517 B2 | 9/2004 | Neer et al. |
| 6,796,717 B2 | 9/2004 | Petrillo |
| 6,801,680 B2 | 10/2004 | Lin |
| 6,810,193 B1 | 10/2004 | Müller |
| 6,815,612 B2 | 11/2004 | Bloodworth et al. |
| 6,819,821 B2 | 11/2004 | Lacey et al. |
| 6,845,207 B2 | 1/2005 | Schray |
| 6,845,208 B2 | 1/2005 | Thibault et al. |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,888,069 B1 | 5/2005 | Chen et al. |
| 6,901,200 B2 | 5/2005 | Schray |
| 6,909,833 B2 | 6/2005 | Henschel et al. |
| 6,912,349 B2 | 6/2005 | Clark et al. |
| 6,916,199 B2 | 7/2005 | Follingstad |
| 6,920,213 B2 | 7/2005 | Pershan |
| 6,920,274 B2 | 7/2005 | Rapp et al. |
| 6,925,241 B2 | 8/2005 | Bohle et al. |
| 6,934,457 B2 | 8/2005 | Vincent et al. |
| 6,937,800 B2 | 8/2005 | Cote |
| 6,950,593 B2 | 9/2005 | Hodge et al. |
| 6,959,139 B2 | 10/2005 | Erwin et al. |
| 6,968,111 B2 | 11/2005 | Trebesch et al. |
| 6,980,725 B1 | 12/2005 | Swieconek |
| 6,983,095 B2 | 1/2006 | Reagan et al. |
| H2144 H | 2/2006 | Baechtle et al. |
| 7,006,748 B2 | 2/2006 | Dagley et al. |
| 7,020,359 B2 | 3/2006 | Mayer |
| 7,029,322 B2 | 4/2006 | Ernst et al. |
| 7,058,245 B2 | 6/2006 | Farahi |
| 7,066,762 B2 | 6/2006 | Neer et al. |
| 7,066,771 B2 | 6/2006 | Clark et al. |
| 7,068,907 B2 | 6/2006 | Schray |
| 7,074,744 B2 | 7/2006 | Selvamanickam et al. |
| 7,086,539 B2 | 8/2006 | Knudsen et al. |
| 7,088,899 B2 | 8/2006 | Reagan et al. |
| 7,090,084 B2 | 8/2006 | Knudsen et al. |
| 7,092,592 B2 | 8/2006 | Verhagen et al. |
| 7,094,095 B1 | 8/2006 | Caveney |
| 7,102,884 B2 | 9/2006 | Mertesdorf et al. |
| 7,103,255 B2 | 9/2006 | Reagan et al. |
| 7,130,498 B2 | 10/2006 | Meis et al. |
| 7,139,456 B2 | 11/2006 | Sasaki et al. |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,179,119 B2 | 2/2007 | Follingstad |
| 7,186,032 B1 | 3/2007 | Stevens et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,241,182 B2 | 7/2007 | Clark et al. |
| 7,244,144 B2 | 7/2007 | Follingstad |
| 7,277,620 B2 | 10/2007 | Vongseng et al. |
| 7,302,153 B2 | 11/2007 | Thom |
| 7,330,546 B2 | 2/2008 | Kessler et al. |
| 7,333,707 B2 | 2/2008 | Puetz et al. |
| 7,335,056 B1 | 2/2008 | Clark et al. |
| 7,346,254 B2 | 3/2008 | Kramer et al. |
| 7,357,667 B2 | 4/2008 | Clark et al. |
| 7,367,823 B2 | 5/2008 | Rapp et al. |
| 7,369,741 B2 | 5/2008 | Reagan et al. |
| 7,376,321 B2 | 5/2008 | Bolster et al. |
| 7,376,322 B2 | 5/2008 | Zimmel et al. |
| 7,376,323 B2 | 5/2008 | Zimmel |
| 7,377,697 B2 | 5/2008 | Kahle et al. |
| 7,391,952 B1 | 6/2008 | Ugolini et al. |
| 7,400,813 B2 | 7/2008 | Zimmel |
| 7,400,816 B2 | 7/2008 | Reagan et al. |
| 7,406,240 B2 | 7/2008 | Murano |
| 7,407,330 B2 | 8/2008 | Smith et al. |
| 7,408,769 B2 | 8/2008 | Mertesdorf et al. |
| 7,412,147 B2 | 8/2008 | Scadden |
| 7,416,349 B2 | 8/2008 | Kramer |
| 7,418,181 B2 | 8/2008 | Zimmel et al. |
| 7,433,915 B2 | 10/2008 | Edwards et al. |
| 7,455,548 B2 | 11/2008 | Clark et al. |
| 7,457,503 B2 | 11/2008 | Solheid et al. |
| 7,460,757 B2 | 12/2008 | Hoehne et al. |
| 7,471,869 B2 | 12/2008 | Reagan et al. |
| 7,493,002 B2 | 2/2009 | Coburn et al. |
| 7,496,268 B2 | 2/2009 | Escoto et al. |
| 7,515,805 B2 | 4/2009 | Vongseng et al. |
| 7,519,259 B2 | 4/2009 | Vongseng et al. |
| 7,534,135 B2 | 5/2009 | Follingstad |
| 7,544,090 B2 | 6/2009 | Follingstad |
| 7,553,091 B2 | 6/2009 | McColloch |
| 7,555,193 B2 | 6/2009 | Rapp et al. |
| 7,623,749 B2 | 11/2009 | Reagan et al. |
| 7,627,204 B1 | 12/2009 | Deane |
| 7,646,958 B1 | 1/2010 | Reagan et al. |
| 7,686,658 B2 | 3/2010 | Clark et al. |
| 7,689,089 B2 | 3/2010 | Wagner et al. |

(56) References Cited

U.S. PATENT DOCUMENTS

| | | |
|---|---|---|
| 7,706,656 B2 | 4/2010 | Zimmel |
| 7,722,261 B2 | 5/2010 | Kadar-Kallen et al. |
| 7,738,755 B2 | 6/2010 | Shioda |
| 7,738,760 B2 | 6/2010 | Fredrickson et al. |
| 7,747,125 B1 | 6/2010 | Lee et al. |
| RE41,460 E | 7/2010 | Wheeler |
| 7,751,674 B2 | 7/2010 | Hill |
| 7,775,725 B2 | 8/2010 | Grinderslev |
| 7,805,043 B2 | 9/2010 | Puetz et al. |
| 7,809,232 B2 | 10/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,822,313 B2 | 10/2010 | Rapp et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,856,166 B2 | 12/2010 | Biribuze et al. |
| 7,873,255 B2 | 1/2011 | Reagan et al. |
| 7,889,961 B2 | 2/2011 | Cote et al. |
| 7,934,948 B2 | 5/2011 | Follingstad |
| 7,942,004 B2 | 5/2011 | Hodder |
| 7,961,999 B2 | 6/2011 | Frohlich et al. |
| 7,983,521 B2 | 7/2011 | Rapp et al. |
| 8,019,192 B2 | 9/2011 | Puetz et al. |
| 8,059,932 B2 | 11/2011 | Hill et al. |
| 8,078,017 B2 | 12/2011 | Kodama et al. |
| 8,085,472 B2 | 12/2011 | Kadar-Kallen |
| 8,139,913 B2 | 3/2012 | Bolster et al. |
| 8,195,022 B2 | 6/2012 | Coburn et al. |
| 8,358,900 B2 | 1/2013 | Rapp et al. |
| 8,374,477 B2 | 2/2013 | Hill |
| 8,406,587 B2 | 3/2013 | Mudd et al. |
| 8,417,074 B2 | 4/2013 | Nhep et al. |
| 8,428,418 B2 | 4/2013 | Smrha |
| 8,600,208 B2 | 12/2013 | Badar et al. |
| 8,649,648 B2 | 2/2014 | Coburn et al. |
| 8,690,593 B2 | 4/2014 | Anderson et al. |
| 8,712,206 B2 | 4/2014 | Cooke et al. |
| 2001/0041025 A1 | 11/2001 | Farahi |
| 2002/0034290 A1 | 3/2002 | Pershan |
| 2002/0097962 A1 | 7/2002 | Yoshimura et al. |
| 2002/0131719 A1 | 9/2002 | Grois et al. |
| 2002/0150372 A1 | 10/2002 | Schray |
| 2002/0181893 A1 | 12/2002 | White et al. |
| 2002/0181922 A1 | 12/2002 | Xin et al. |
| 2003/0002812 A1 | 1/2003 | Lampert |
| 2003/0006333 A1 | 1/2003 | Cooper |
| 2003/0007767 A1 | 1/2003 | Douglas et al. |
| 2003/0042040 A1 | 3/2003 | Komiya et al. |
| 2003/0044141 A1 | 3/2003 | Melton et al. |
| 2003/0072537 A1 | 4/2003 | Eichenberger et al. |
| 2003/0095772 A1 | 5/2003 | Solheid et al. |
| 2003/0128951 A1 | 7/2003 | Lecomte et al. |
| 2003/0147597 A1 | 8/2003 | Duran |
| 2003/0165315 A1 | 9/2003 | Trebesch et al. |
| 2003/0174953 A1 | 9/2003 | Carnevale et al. |
| 2003/0174996 A1 | 9/2003 | Henschel et al. |
| 2003/0182015 A1 | 9/2003 | Domaille et al. |
| 2003/0223724 A1 | 12/2003 | Puetz et al. |
| 2004/0028368 A1 | 2/2004 | Hileman et al. |
| 2004/0074852 A1 | 4/2004 | Knudsen et al. |
| 2004/0109660 A1 | 6/2004 | Liberty |
| 2004/0126069 A1 | 7/2004 | Jong et al. |
| 2004/0136638 A1 | 7/2004 | Baechtle et al. |
| 2004/0165852 A1 | 8/2004 | Erwin et al. |
| 2004/0172492 A1 | 9/2004 | Farnworth et al. |
| 2004/0175090 A1 | 9/2004 | Vastmans et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0003697 A1 | 1/2005 | Neer et al. |
| 2005/0018950 A1 | 1/2005 | Arellano |
| 2005/0048831 A1 | 3/2005 | Neer et al. |
| 2005/0053337 A1 | 3/2005 | Mayer |
| 2005/0084200 A1 | 4/2005 | Meis et al. |
| 2005/0123261 A1 | 6/2005 | Bellekens et al. |
| 2005/0129379 A1 | 6/2005 | Reagan et al. |
| 2006/0029353 A1 | 2/2006 | Bolster et al. |
| 2006/0093274 A1 | 5/2006 | Kahle et al. |
| 2006/0093301 A1 | 5/2006 | Zimmel et al. |
| 2006/0177175 A1 | 8/2006 | Mayer et al. |
| 2006/0210222 A1 | 9/2006 | Watte et al. |
| 2006/0210229 A1 | 9/2006 | Scadden |
| 2006/0228086 A1 | 10/2006 | Holmberg et al. |
| 2006/0269205 A1 | 11/2006 | Zimmel |
| 2006/0269206 A1 | 11/2006 | Zimmel |
| 2007/0003204 A1 | 1/2007 | Makrides-Saravanos et al. |
| 2007/0025675 A1 | 2/2007 | Kramer |
| 2007/0047893 A1 | 3/2007 | Kramer et al. |
| 2007/0189692 A1 | 8/2007 | Zimmel et al. |
| 2007/0230863 A1 | 10/2007 | Fukuda et al. |
| 2008/0008436 A1 | 1/2008 | Reagan et al. |
| 2008/0008437 A1 | 1/2008 | Reagan et al. |
| 2008/0019655 A1 | 1/2008 | Vongseng et al. |
| 2008/0025684 A1 | 1/2008 | Vongseng et al. |
| 2008/0089656 A1 | 4/2008 | Wagner et al. |
| 2008/0131067 A1 | 6/2008 | Ugolini et al. |
| 2008/0175550 A1 | 7/2008 | Coburn et al. |
| 2008/0273846 A1 | 11/2008 | Register |
| 2008/0317425 A1 | 12/2008 | Smith et al. |
| 2009/0041417 A1 | 2/2009 | Rapp et al. |
| 2009/0067800 A1 | 3/2009 | Vazquez et al. |
| 2009/0067802 A1 | 3/2009 | Hoehne et al. |
| 2009/0074372 A1 | 3/2009 | Solheid et al. |
| 2009/0087157 A1 | 4/2009 | Smith et al. |
| 2009/0097800 A1 | 4/2009 | Gurreri et al. |
| 2009/0097813 A1 | 4/2009 | Hill |
| 2009/0190896 A1 | 7/2009 | Smith et al. |
| 2009/0196565 A1 | 8/2009 | Vongseng et al. |
| 2009/0230228 A1 | 9/2009 | Penumatcha et al. |
| 2009/0245743 A1 | 10/2009 | Cote et al. |
| 2009/0257726 A1 | 10/2009 | Redmann et al. |
| 2009/0269018 A1 | 10/2009 | Frohlich et al. |
| 2009/0274431 A1 | 11/2009 | Krampotich et al. |
| 2009/0285540 A1 | 11/2009 | Reagan et al. |
| 2009/0290843 A1 | 11/2009 | Reagan et al. |
| 2009/0297111 A1 | 12/2009 | Reagan et al. |
| 2009/0324189 A1 | 12/2009 | Hill et al. |
| 2010/0129028 A1 | 5/2010 | Nhep et al. |
| 2010/0129039 A1* | 5/2010 | Smrha .................. H04Q 1/023 385/134 |
| 2010/0142910 A1 | 6/2010 | Hill et al. |
| 2010/0158465 A1 | 6/2010 | Smrha |
| 2010/0316335 A1 | 12/2010 | Furuyama |
| 2010/0322562 A1 | 12/2010 | Barnes et al. |
| 2010/0322576 A1 | 12/2010 | Rhoney et al. |
| 2010/0322577 A1 | 12/2010 | Bolster et al. |
| 2010/0322579 A1 | 12/2010 | Cooke et al. |
| 2010/0322584 A1 | 12/2010 | Kowalczyk et al. |
| 2011/0019964 A1 | 1/2011 | Nhep et al. |
| 2011/0044599 A1 | 2/2011 | Kowalczyk et al. |
| 2011/0065909 A1 | 3/2011 | Lange et al. |
| 2011/0085771 A1 | 4/2011 | Matsuyama et al. |
| 2011/0096404 A1 | 4/2011 | Kadar-Kallen |
| 2011/0110673 A1 | 5/2011 | Elberbaum |
| 2011/0158597 A1 | 6/2011 | Bell |
| 2011/0182558 A1 | 7/2011 | Garcia et al. |
| 2011/0217016 A1 | 9/2011 | Mullsteff |
| 2011/0222829 A1 | 9/2011 | Loeffelholz et al. |
| 2011/0262077 A1 | 10/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0268414 A1 | 11/2011 | Giraud et al. |
| 2011/0274400 A1 | 11/2011 | Mudd et al. |
| 2011/0317973 A1 | 12/2011 | Rapp et al. |
| 2012/0008900 A1 | 1/2012 | Schneider |
| 2012/0014645 A1 | 1/2012 | Kadar-Kallen |
| 2012/0020618 A1 | 1/2012 | Erdman et al. |
| 2012/0020619 A1 | 1/2012 | Kadar-Kallen et al. |
| 2012/0051706 A1 | 3/2012 | Van Geffen et al. |

(56) References Cited

U.S. PATENT DOCUMENTS

| | | |
|---|---|---|
| 2012/0051708 A1 | 3/2012 | Badar et al. |
| 2012/0057838 A1 | 3/2012 | Hill et al. |
| 2012/0263415 A1 | 10/2012 | Tan et al. |
| 2012/0301098 A1 | 11/2012 | Benedetto et al. |
| 2013/0004506 A1 | 1/2013 | Miller et al. |
| 2013/0064495 A1 | 3/2013 | Eberle, Jr. |
| 2013/0064506 A1 | 3/2013 | Eberle et al. |
| 2013/0075522 A1 | 3/2013 | Penumatcha |
| 2013/0077913 A1 | 3/2013 | Schneider et al. |
| 2013/0089292 A1 | 4/2013 | Ott et al. |
| 2013/0115808 A1* | 5/2013 | Pezzetti .......... H01R 13/60 439/540.1 |
| 2014/0091169 A1 | 4/2014 | Ott |

FOREIGN PATENT DOCUMENTS

| | | |
|---|---|---|
| CN | 2426610 Y | 4/2001 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0 697 610 A1 | 2/1996 |
| EP | 0 743 701 A2 | 11/1996 |
| EP | 0 788 002 A1 | 8/1997 |
| EP | 0 871 047 A1 | 10/1998 |
| EP | 0 563 995 B1 | 10/1999 |
| EP | 0 975 180 A1 | 1/2000 |
| EP | 1 045 267 A1 | 10/2000 |
| FR | 2 531 576 A1 | 2/1984 |
| FR | 2 587 127 A1 | 3/1987 |
| JP | 59-74523 | 4/1984 |
| JP | 60-169811 | 9/1985 |
| JP | 61-55607 | 3/1986 |
| JP | 61-90104 | 5/1986 |
| JP | 63-229409 | 9/1988 |
| JP | 1144266 S | 6/2002 |
| JP | 3307618 B2 | 7/2002 |
| JP | 3761762 B2 | 3/2006 |
| WO | WO 91/10927 | 7/1991 |
| WO | WO 94/17534 | 8/1994 |
| WO | WO 95/20175 | 7/1995 |
| WO | WO 98/53347 | 11/1998 |
| WO | WO 99/27404 | 6/1999 |
| WO | WO 00/05611 | 2/2000 |
| WO | WO 00/07053 | 2/2000 |
| WO | WO 00/52504 | 9/2000 |
| WO | WO 00/75706 | 12/2000 |
| WO | WO 01/75495 | 10/2001 |
| WO | WO 02/21182 | 3/2002 |
| WO | WO 02/103429 | 12/2002 |
| WO | WO 03/021312 | 3/2003 |
| WO | WO 03/093883 A2 | 11/2003 |
| WO | WO 2008/089192 | 7/2008 |
| WO | WO 2009/120280 | 10/2009 |

OTHER PUBLICATIONS 24 photos of LambdaUnite® Blank Card; "LambdaUnite® MultiService Switch (MSS)" brochure (2003); and "Lucent's LambdaUnite® Busts Out" official release, dated Jan. 29, 2002 (33 pages total).

ADC Telecommunications, Inc. brochure entitled "ADC OMX 600 Optical Distribution Frame Solution," Publication No. 856, 8 pages, dated Feb. 2000.

ADC Telecommunications, Inc. brochure entitled "Fiber Cable Management Products, Second Edition," Publication No. 804, 149 pages, dated Oct. 1995.

ADC Telecommunications, Inc. brochure entitled "FL2000 Products," Publication No. 803, 51 pages, dated Nov. 1996.

ADC Telecommunications, Inc. brochure entitled "Next Generation Frame (NGF) Product Family Ordering Guide," Publication No. 820, 22 pages, dated Oct. 1998.

ADC Telecommunications, Inc. brochure entitled "OMX™ 600 Optical Distribution Frame," Publication No. 854, front cover, table of contents, pp. 1-13, rear cover, dated Apr. 2000 (15 pages total).

ADC Telecommunications, Inc. brochure entitled "Fiber Optic, Cable Assemblies and Accessories," Publication No. 100300, 26 pages, dated Apr. 2003.

ADC Telecommunications, Inc. brochure entitled "Next Generation Frame (NGF) Product Family Ordering Guide, $6^{th}$ Edition," Publication No. 820, 44 pages, dated Feb. 2003.

ADC Telecommunications, Inc. brochure entitled "Next Generation Frame (NGF) Product Family," Publication No. 832, 8 pages, dated Dec. 2000.

ADC Telecommunications, Inc. brochure entitled "Value-Added Module (VAM) System: Monitor, Splitter, WDM and CWDM Modules and Chassis for Switching Office, Central Exchange and Headend Applications, 1st edition," Part No. 101663BE, 36 pages, dated Feb. 2008.

ADC Telecommunications, Inc. brochure entitled "Value-Added Module (VAM) System—Monitor, Splitter, WDM/CWDM/DWDM Modules and Chassis, $5^{th}$ Edition," Part No. 101663AE, 32 pages, dated Oct. 2009.

ADC Telecommunications, Inc., "Mini VAM Connector Cleaning Instructions," ADCP-90-412, Issue 3, pp. 1-8, dated Sep. 2002.

ADC Telecommunications, Inc., brochure entitled "600 mm Products", Publication No. 100571, pp. 53-78, dated Oct. 2003 (26 pages total).

ADC Telecommunications, Inc., brochure entitled "Fiber Management Tray: 2 Rack Unit (2 RU) Style FMT-G Series," Publication No. 1258896, 8 pages, dated Mar. 2003.

ADC Telecommunications, Inc., brochure entitled "Fiber Panel Products, Second Edition," Publication No. 846, 116 pages, dated Jul. 1996.

ADC Telecommunications, Inc., brochure entitled "Outside Plant, Fiber Cross-Connect Solutions," Publication No. 1047, 51 pages, dated Jun. 2002.

ADC Telecommunications, Inc., brochure entitled "Secure Fiber Entrance Terminal (SFET)," Publication No. 1005, 8 pages, dated May 1998.

ADC Telecommunications, Inc., brochure entitled "Value-Added Module System," Publication No. 891, 29 pages, dated Apr. 2000.

ADC Telecommunications, Inc., brochure entitled "Value-Added Module System: Optical Distribution Frame (OMX™ 600)," Publication No. 891-OMX, 11 pages, dated Jan. 2002.

ADC Telecommunications, Inc., FMT Micro Value Added Monitor Module Configuration Scheme, 2 pages, dated Feb. 6, 2003.

ADC Telecommunications, Inc., Mini Value Added Splitter Module Catalog Number Scheme (Installation Drawing), Drawing No. 1128185, 2 pages, dated Mar. 14, 2001.

ADC Telecommunications, Inc., Next Generation Frame (NGF) Product Tour, Value Added Modules (VAMs), Copyright 2003, 1 page, (admitted as offered for sale as of Apr. 25, 2006).

Alcoa Fujikura Ltd. brochure entitled "Couplers: Couplers WDMS Packaging,", 5 pages (Copyright 2000).

AMP Inc. catalog entitled "Fiber Optic Products," front and back covers and p. 59, (Copyright 1991) (4 pages total).

Amphenol Corp., brochure entitled "Amphenol® 954 Series one piece SC Connector," F122-00311, Issue 1, 2 pages, dated Aug. 1990.

Assembly reference drawings having drawing No. 1067101, 8 pages, dated Aug. 17, 1999.

AT&T Network Systems catalog entitled "Fiber Optic Products Innovation for wide ranging applications," front and back covers and pp. 6-1 through 6-16 (Copyright 1995) (18 pages total).

(56) References Cited

OTHER PUBLICATIONS

AT&T Network Systems Product Bulletin entitled "High Density Interconnect System (HDIC)," 2987D-DLH-7/89, Issue 2, 4 pages (Copyright 1989).
ATI Optique Division of TI electronique, "ATI Optique Catalog," Version 2.6, released Mar. 27, 2002 (50 pages).
Bockstaele et al., "A scalable parallel optical interconnect family," IO Overview Paper—Apr. 2004.
Connectorized splitter drawings having drawing No. 1067961, 2 pages, dated Aug. 18, 1999.
Corning Cable Systems, "Installation Instructions for 12-position Splice Protector Insert," SRP-001-276, Issue 4, 1 page (Jul. 2001).
Corning Cable Systems, "Jumper Routing Procedure for Enhanced Management Frame," SRP-003-599, Issue 2, 4 pages (Apr. 2002).
Fiber distribution drawings having drawing No. 1069967, 2 pages, dated Aug. 17, 1999.
FONS Corporation product sheet entitled "MDC Series Rack or Wall Mount Enclosures," 3 pages (Copyright 2002).
FONS Corporation product sheet entitled "Modular Distribution Cabinets Rack Mount Enclosures," 2 pages (Copyright 2005).
FONS Corporation's Technical Drawing No. 11669, Rev. D, of Distribution Cabinet Assembly MFDC-7, 1 page.
Grimes, Gary J., "Applications of Parallel Optical Interconnects," Lasers and Electro-Optics Society Annual Meeting, Nov. 18-21, 1996, vol. 2, pp. 6-7.
Hasegawa et al., "100GHz-48CH Athermal AWG with a Novel Temperature Insensitive Principle," National Fiber Optics Engineers Conference, 2003 Technical Proceedings, pp. 801-808.
Hirose Electric Co., Ltd. catalog entitled "Optical Fibre Connectors," Catalog No. O.F. (9) 3K, front and back covers and pp. 16, 17, and 49, dated Mar. 1991 (5 pages total).
Installation drawings having drawing No. 1069965, 3 pages, dated Aug. 14, 1999.
International Standard, "Fibre optic connector interfaces—Part 4-1: Type SC connector family—Simplified receptacle SC-PC connecter interfaces," IEC 61754-4-1, First Edition, 9 pages (Copyright 2003).
Iwano et al., "MU-type Optical Fiber Connector System," *NTT Review*, vol. 9, No. 2, pp. 63-71 (Mar. 1997).
Nexans, "Cross-Connect Cabinet III: Plastic Watertight Cabinet for FTTH Applications," 2 pages (Oct. 2002).
Nexans, "Cross-Connect Cabinet V: Metallic Watertight Cabinet for FTTH Applications," 2 pages (Oct. 2002).
Northern Telecom Bulletin #91-004, Issue #2, 16 pages (May 1991).
NTT International brochure entitled "Fiber Termination Module (FTM) & Premises Optical Distribution Cabinets (PODC)," 3 pages, undated.
"Optical fiber coupler review," Manufacturing Group at the Optoelectronics Division, Technical Report 2001, Products Presentation, showing Sumitomo Osaka Cement Co. Ltd's Optical Coupler (pp. 41-42).
Precision Mechanical, in Chinese with English Translation, 5 pages (publicly known at least as early as Aug. 2002).
Preface to the book "Structure, Installation, Connection and Protection of Communication Optical Fiber Cable," in Chinese with English Translation, 14 pages (Mar. 1992).
Schneider et al., "Fibre Optic Circuits," TechCon 2011 (10 pages).
Shahid, et al., "Flexible High Density Optical Circuits," National Fiber Optic Engineers Conference, 2001 Technical Proceedings.
Sugita et al., "SC-Type Single-Mode Optical Fiber Connectors," *Journal of Lightwave Technology*, vol. 7, No. 11, pp. 1689-1696 (Nov. 1989).
Tachikura et al., Newly Developed Optical Fiber Distribution System and Cable Management in Central Office, International Wire & Cable Symposium, Proceedings of the 50th IWCS, pp. 98-105.

\* cited by examiner

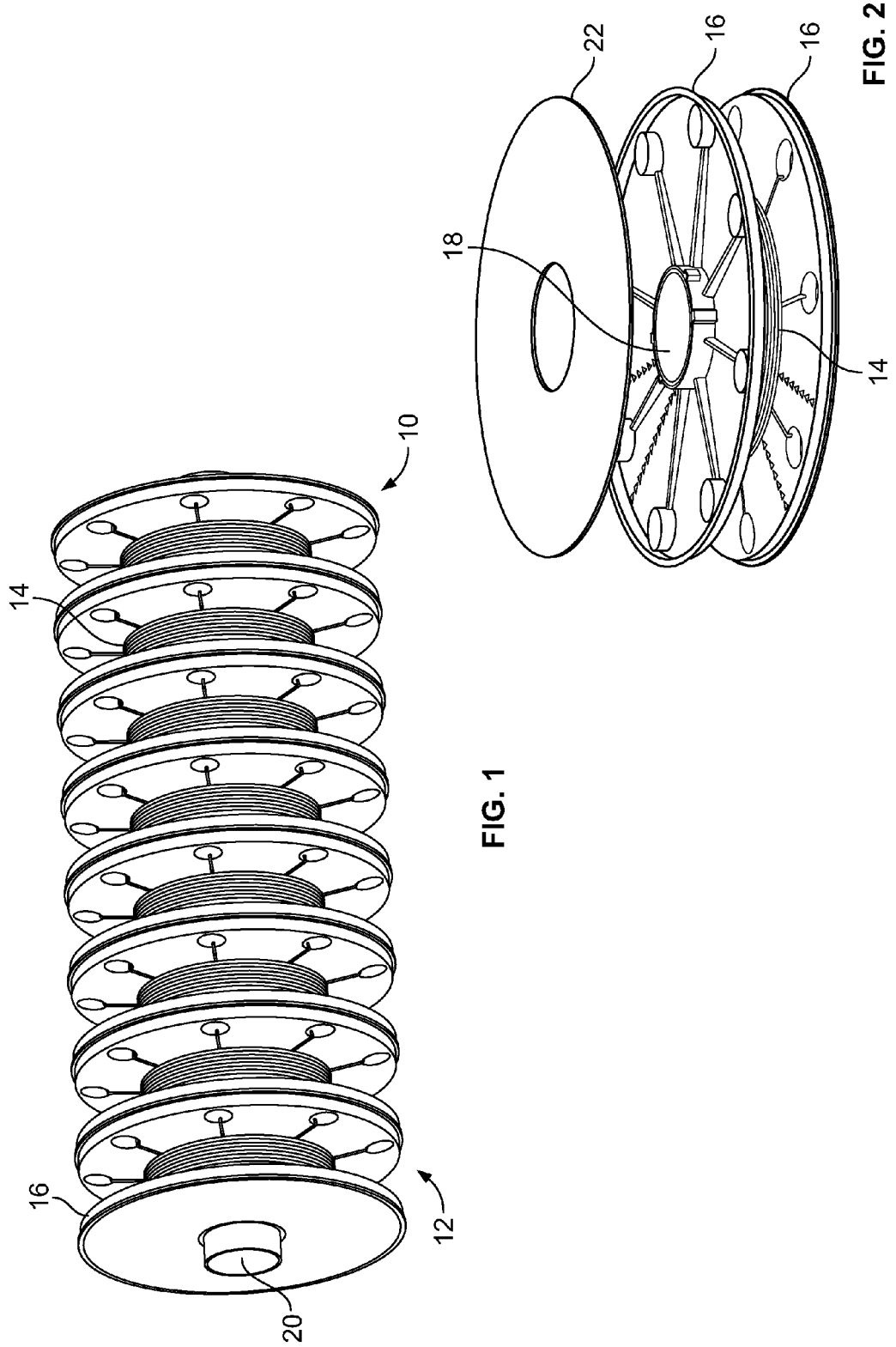

RAPID DEPLOYMENT PACKAGING FOR OPTICAL FIBER

CROSS REFERENCE TO RELATED APPLICATIONS

This application is a divisional of U.S. patent application Ser. No. 14/038,066, filed Sep. 26, 2013, now U.S. Pat. No. 9,146,374, which claims the benefit of U.S. Provisional Application No. 61/707,517, filed Sep. 28, 2012, the disclosures of which are hereby incorporated herein by reference.

TECHNICAL FIELD

The present disclosure relates to fiber optic telecommunications devices. More specifically, the present disclosure relates to packaging arrangements for storage, shipping, and rapid deployment of fiber optic cables.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for fiber optic deployment packaging arrangements that can effectively manage varying lengths of subscriber cable. There is also a need for fiber optic cable storage, transport, and deployment packaging assemblies that utilize cost-effective, recyclable materials.

SUMMARY

An aspect of the present disclosure relates to a deployment packaging arrangement for fiber optic cabling. The arrangement includes a plurality of spools disposed around a core or a spindle, each independently rotatable with respect to the core for winding/unwinding the fiber optic cable, wherein flanges defining the spools include hollow portions to provide a compartment for storage of pre-terminated cable ends. According to one embodiment, each flange defines an opening or a passage large enough to allow a termination element to be pulled through the flange after the cable has been unwound from the spool and deployed.

Another aspect of the present disclosure relates to a method of fiber optic cable deployment utilizing a modular cable deployment or pulling system that includes a plurality of cable termination elements coupled together using a system of snap-fit carriers for the termination elements, wherein all of the termination elements, and, thus, the cables terminated with each of the termination elements can be pulled at the same time. The carriers may be designed/structured based on the termination elements used for the cabling to be deployed.

A further aspect of the present disclosure relates to a packaging arrangement for winding telecommunications cabling, the packaging arrangement comprising a modular spool assembly defined by a first flange, an opposing second flange, and a spool hub separating the first flange from the second flange, wherein a telecommunications cable may be wound between the first and second flanges. Each flange defines a first cable contact side, a second cable-end storage side, and an opening allowing the telecommunications cable to pass from the first side to the second side, the second side defining a storage compartment for storing an end of the telecommunications cable passing through the opening in the flange.

A further aspect of the present disclosure relates to a cable deployment system comprising a plurality of carriers detachably coupled together (e.g., with a snap-fit interlock according to one example embodiment), each carrier including a retention structure for holding a telecommunications device terminated to an end of a telecommunications cable. Each carrier may include a male snap-fit structure and a female snap-fit structure, wherein the male snap-fit structure is configured to be interlocked with the female snap-fit structure of another one of the carriers.

A further aspect of the present disclosure relates to a method of deploying a plurality of cables from a packaging arrangement, each cable wound around a separate spool, the method comprising removably attaching telecommunications devices that are terminated to ends of each of the cables to carriers, wherein the carriers are removably attached to each other with a snap-fit interlock, and pulling all of the carriers at the same time away from the spools.

A further aspect of the present disclosure relates to a method of assembling a packaging arrangement for telecommunications cabling, the method comprising constructing a spool by coupling a first flange to a second flange with a spool hub, each flange defining a first cable contact side, a second cable-end storage side, passing an end of a telecommunications cable through either the first flange or the second flange through an opening on the flange from the first side to the second side of the flange, winding the telecommunications cable around the hub between the first flange and the second flange, and placing the spool around a spindle.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DESCRIPTION OF THE DRAWINGS

FIG. 1 is a first embodiment of a deployment packaging arrangement for fiber optic cable, the packaging arrangement having features that are examples of inventive aspects in accordance with the principles of the present disclosure;

FIG. 2 illustrates a partially exploded view of one of the spools of the packaging arrangement of FIG. 1, the spool shown with a cover exploded thereof;

DETAILED DESCRIPTION

Figure 5:
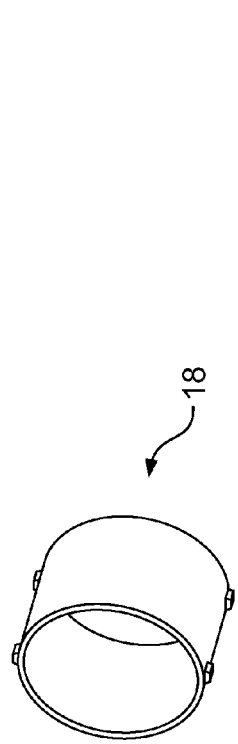
FIG. 5 is a spool hub for coupling two flanges for forming a spool as shown in FIG. 2.

Reference will now be made in detail to the exemplary aspects of the present disclosure that are illustrated in the accompanying drawings. Wherever possible, the same reference numbers will be used throughout the drawings to refer to the same or like structure.

Referring now to FIGS. 1-7, a first embodiment of a deployment packaging arrangement 10 for fiber optic cabling is illustrated, the packaging arrangement 10 having features that are examples of inventive aspects in accordance with the principles of the present disclosure. The packaging arrangement 10 generally defines a plurality of spools 12, each configured for storing a loop of telecommunications cable 14 (e.g., fiber optic cable). Each spool 12 is formed from two opposing flanges 16 coupled together with a spool hub 18. The spool hub 18, once used to join the flanges 16, is positioned around a spindle 20. Once assembled, each of the spools 12 of the packaging arrangement 10 is individually rotatable with respect to the spindle 20 in winding and/or unwinding the cabling.

Figure 6:
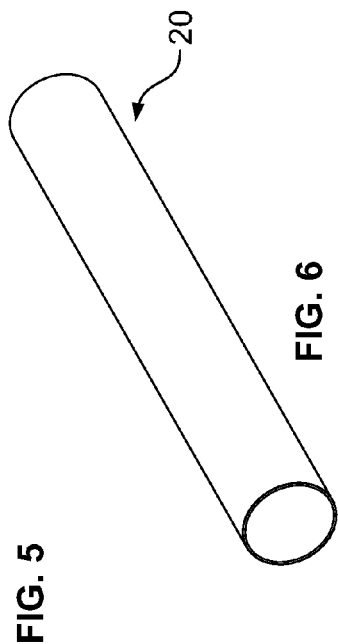
FIG. 6 illustrates a core or a spindle of the packaging arrangement of FIG. 1, the plurality of spools shown in FIG. 1 disposed around the spindle to define the packaging arrangement.
Figure 7:
FIG. 7 illustrates the cover of one of the spools illustrated in FIG. 1.
Figure 3:
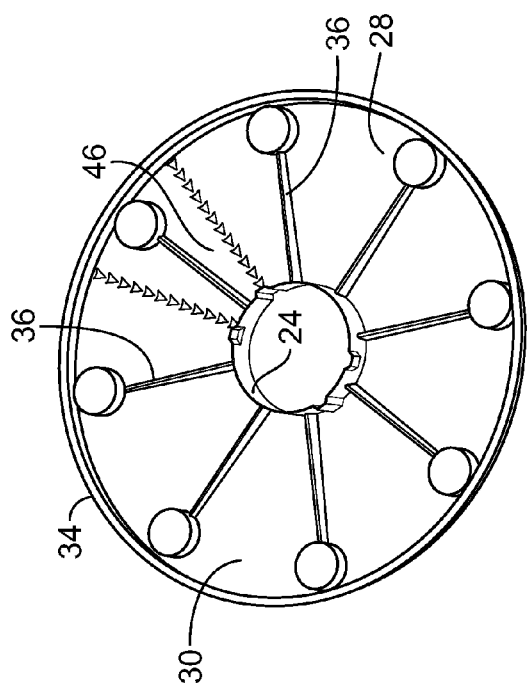
FIG. 3 illustrates one of the flanges defining the spool of FIG. 2, the termination element storage side of the flange shown.
Figure 4:
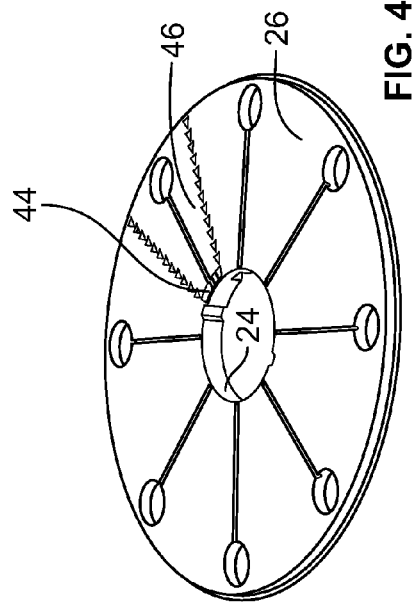
FIG. 4 illustrates the cabling storage side of the flange of FIG. 3.

FIG. 1 illustrates a deployment packaging arrangement 10 that is formed from eight spools 12. It should be noted, depending upon the application needed, other numbers are possible. The packaging arrangement 10 is modular such that the number of spools 12 can be scaled up or down depending upon the desired need by using the appropriate length spindle 20. FIG. 2 illustrates a partially exploded view of one of the spools 12 of the packaging arrangement 10 of FIG. 1, the spool 12 shown with a cover 22 exploded therefrom. FIGS. 3-4 illustrate one of the flanges 16 defining the spools 12 of the packaging arrangement 10. The flanges 16 may be formed from molded polymers. FIG. 5 is a spool hub 18 for coupling two flanges 16 for forming a spool 12 as shown in FIG. 2. The spool hub 18 is frictionally fit into a hub receiver 24 of each flange 16 in forming the spool 12. FIG. 6 illustrates an example of a core or a spindle 20 that may be used to form the packaging arrangement 10 of FIG. 1. The spindle 20, according to one example embodiment, may be formed from cardboard tubing. The plurality of spools 12 of the packaging arrangement 10 are slidably disposed around the spindle 20 and each of the spools 12 is rotatable with respect to the spindle 20. FIG. 7 illustrates the cover 22 of one of the spools 12 in isolation. The cover 22 may also be formed from cardboard material. Thus, all of the major parts of the packaging arrangement 10 are formed from low cost, generally recyclable materials.

Referring now specifically to FIGS. 2-3, each flange 16 defining the spool 12 has a first side 26 that makes contact with the cable 14 (i.e., a cable-winding side) and a second opposite side 28 that defines a compartment 30 for storing a cable termination element 32 as will be described in further detail below. The storage compartment 30 is defined by a lip 34 that protrudes around the perimeter of the flange 16. As shown in FIG. 1, when the spools 12 are arranged on the spindle 20, the two second sides 28 of adjacent spools 12 face each other. Each flange 16 defines a plurality of reinforcement elements 36 that extend between the center spool hub receiver 24 and the outer perimeter of the flange 16.

Figure 8:
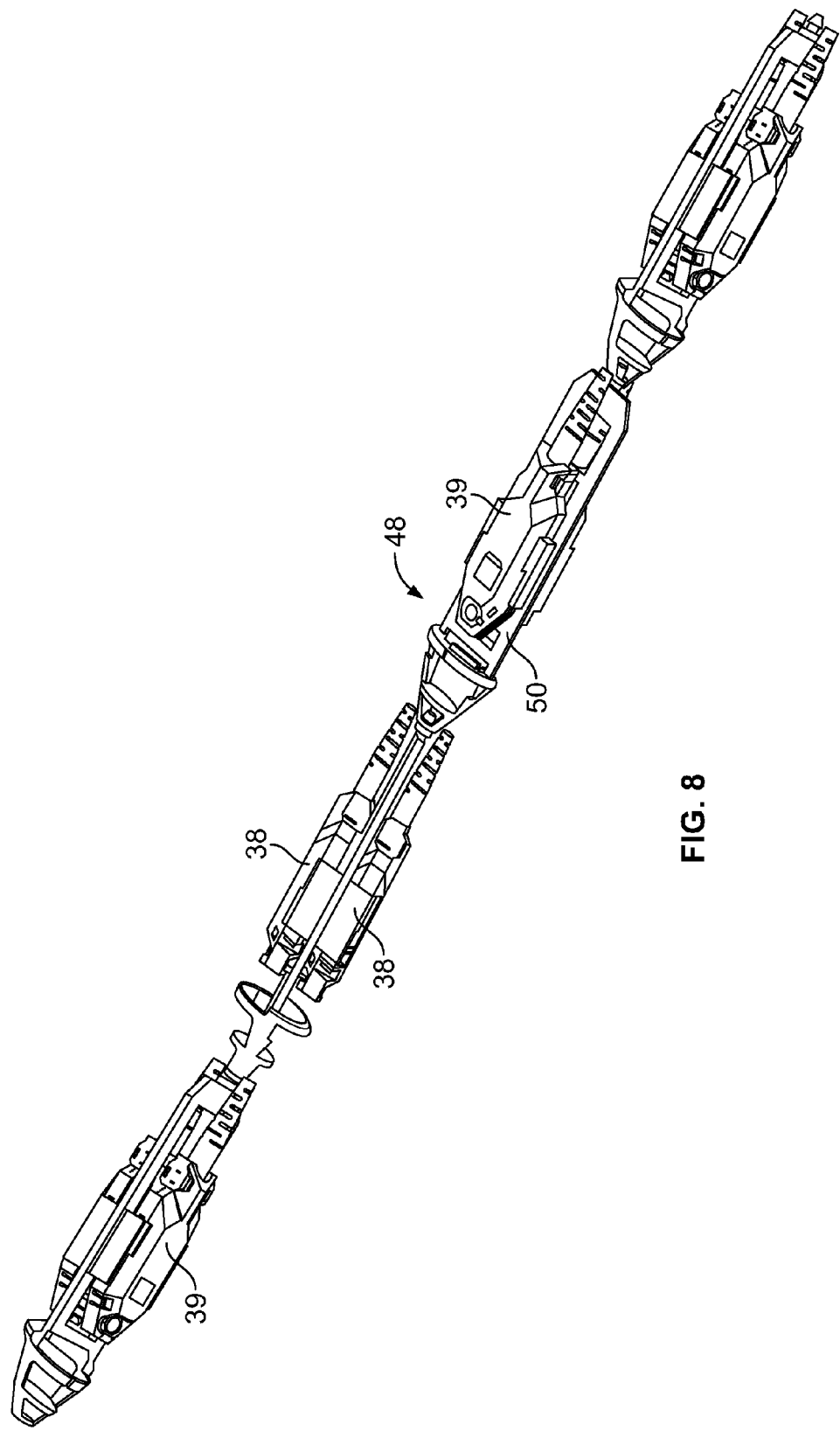
FIG. 8 illustrates a modular cable pulling system that includes a plurality of cable termination elements coupled together using a system of snap-fit carriers, the modular cable pulling system having features that are examples of inventive aspects in accordance with the principles of the present disclosure, the modular cable pulling system illustrated with multi-fiber MPO type connectors enclosed within enclosures as the cable termination elements.
Figure 9:
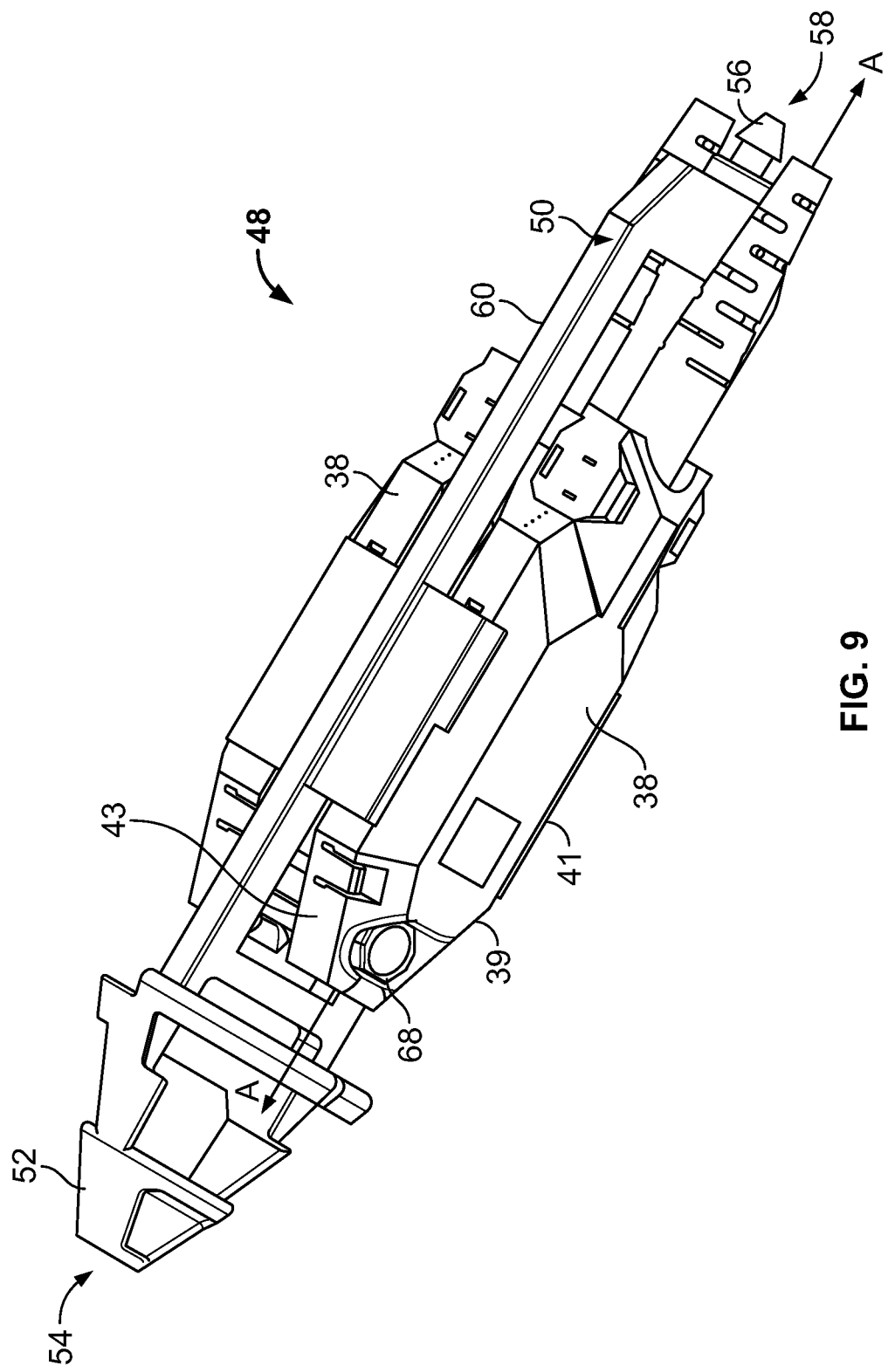
FIG. 9 illustrates one of the carriers of the modular cable pulling system of FIG. 8 carrying two MPO type connectors.
Figure 11:
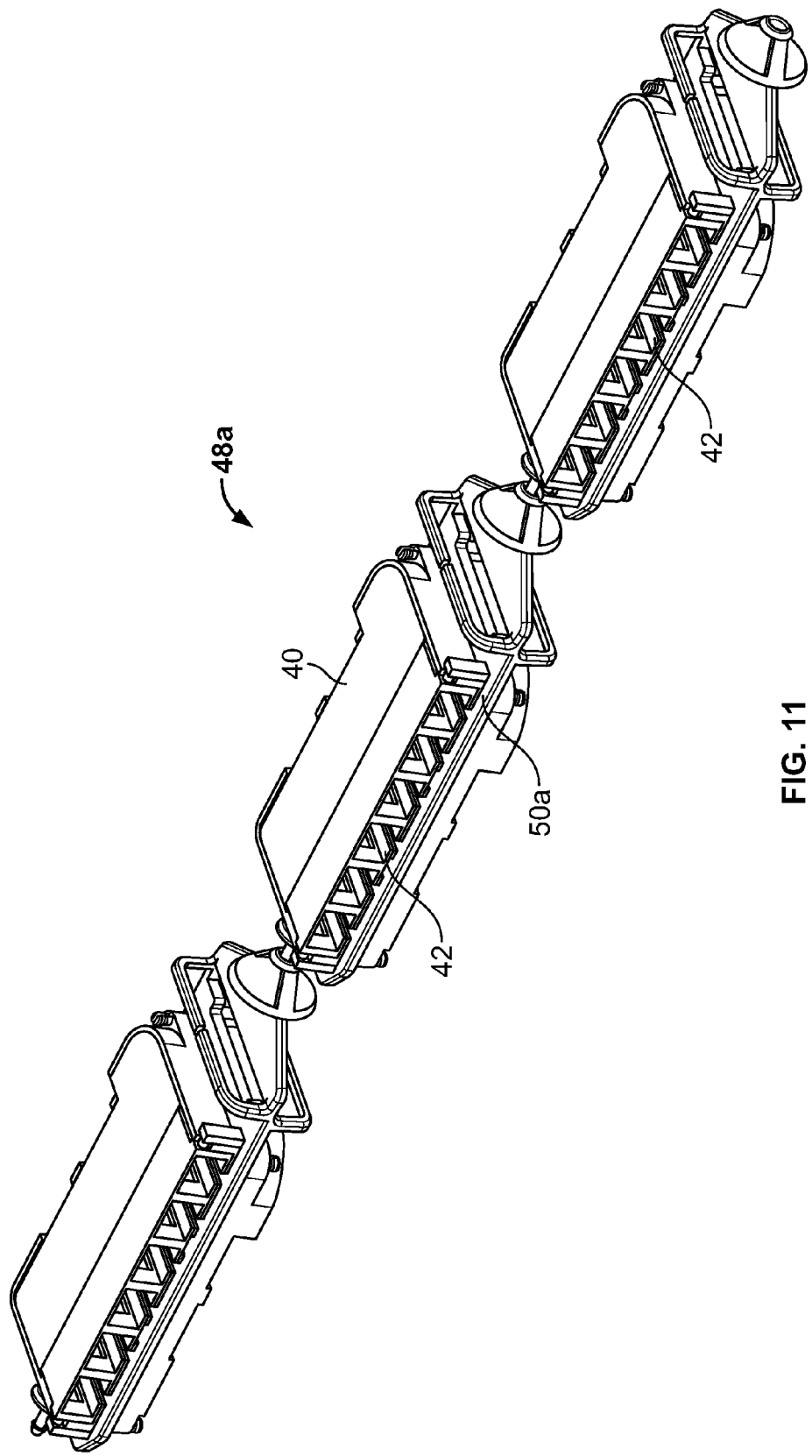
FIG. 11 illustrates a modular cable pulling system similar to that shown in FIG. 8, the modular cable pulling system including a plurality of snap-fit carriers configured to carry cable termination elements in the form of fiber optic cassettes having SC type adapters.
Figure 12:
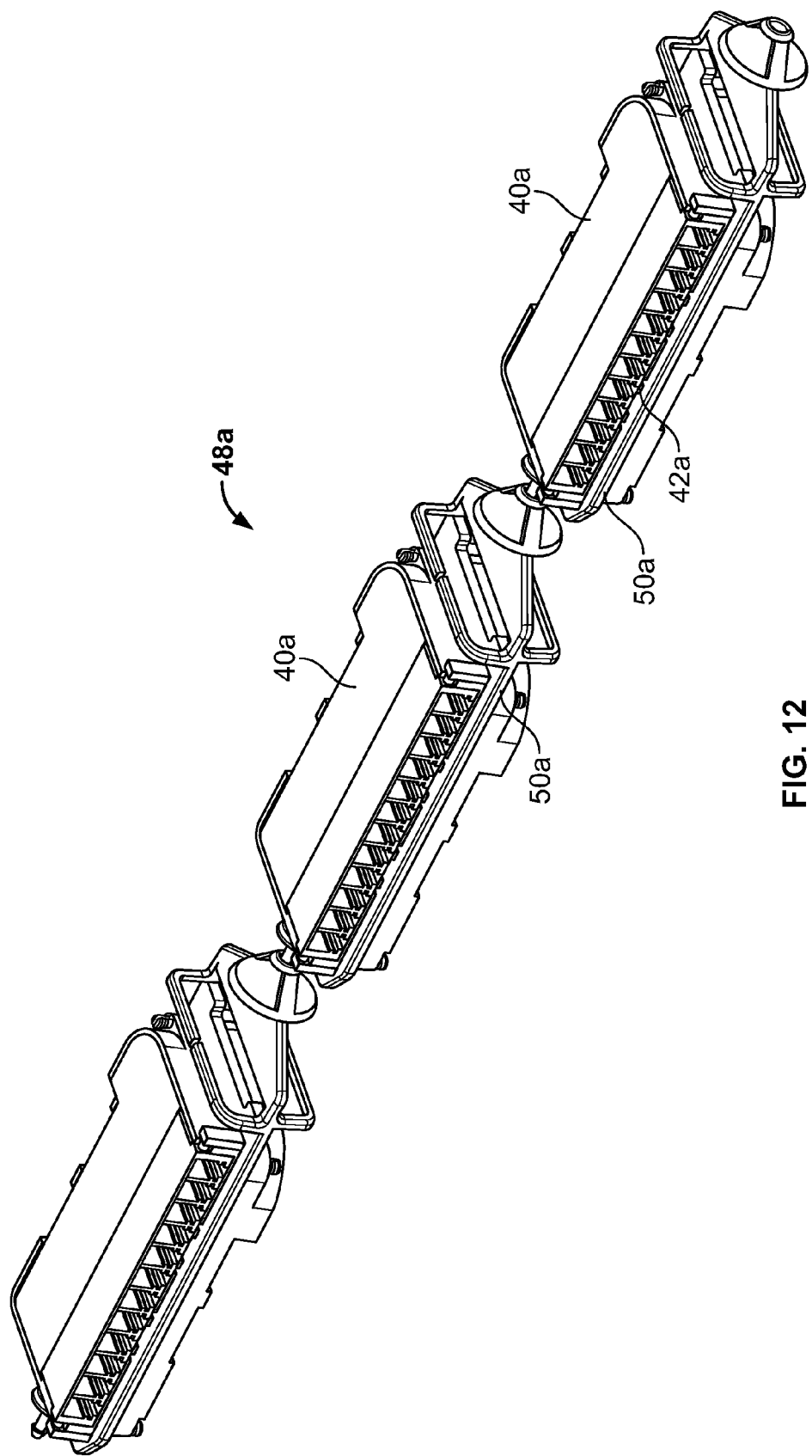
FIG. 12 illustrates the modular cable pulling system of FIG. 11, wherein the carriers are carrying cable termination elements in the form of fiber optic cassettes having LC type adapters.

As noted above, the storage compartment 30 defined by the second side 28 of the flange 16 may be used to store a termination element 32 that might be terminated to one end of the cable 14. A termination element 32 generally refers to any device that might be used to terminate the end of a cable 14 for further connectivity. An example of a termination element 32 might be a telecommunications connector 38 that is terminated to the cable 14. For example, the telecommunications connector 38 may be a fiber optic connector. The fiber optic connector 38 may be a multi-fiber optic connector such as an MPO connector 38, an example of which is shown in FIGS. 8-9. Another example of a termination element 32 might be a telecommunications device in the form of a fiber optic cassette 40 that is configured to branch out fibers coming from a multi-fiber cable 14 to separate connection locations. Such connection locations may be defined by fiber optic adapters 42 as will be described in further detail. An example of a fiber optic cassette 40 is shown in FIG. 11, the fiber optic cassette 40 defining SC type adapters 42 as the connection locations. Another example of a fiber optic cassette 40a that defines LC type adapters 42a is shown in FIG. 12.

Although the principles of the present disclosure will be described and illustrated in terms of cable termination elements 32 in the form of fiber optic connectors 38 or fiber optic cassettes 40, it should be noted that the principles herein may be applicable to others types of structures that may be terminated at the ends of the fiber optic cables 14 stored in the packaging arrangement 10.

Now referring to FIGS. 1, 2, and 7, once an end of a cable 14 (either preterminated or postterminated) has been passed through the flange 16 into the storage compartment 30, the cover 22 may be frictionally fit around the hub receiving portion 24 of the flange 16 to enclose the storage compartment 30. It should be noted that a cover 22 may be used at each end of the packaging arrangement 10 or may be used between each of the individual spools 12. The cover 22 may provide reinforcement and further rigidity to the flanges 16. The term "postterminated" refers to an end of a cable that is terminated with a device after the cable has been passed through an opening 44 of the flange 16 as will be described in further detail below.

As discussed above, during the initial assembly of the packaging arrangement 10, for each spool 12, one end of a cable 14, before that cable 14 is wound around the spool 12, is passed through one of the flanges 16 of the spool 12 and is contained within the storage compartment 30. The end that is passed through the flange 16 may be unterminated when initially winding the cable 14 around the spool 12 and may be terminated afterwards with a termination element 32 after passing that end through the spool 12. As shown in FIGS. 2-4, the flange 16 defines a passage or opening 44 that is large enough to pass an end of an unterminated cable 14 through the flange 16 from the first side 26 to the second side 28. Also, the flange 16 defines a scored section 46 which may be removed from the flange 16 if the end of the cable 14 that is passed through the flange 16 has been preterminated with a larger cable termination element 32. The scored portion 46 may also be removed after deployment once all of the cable 14 has been unwound when a postterminated end needs to be passed from the second side 28 to the first side 26 of the flange 16 to completely remove the cabling from the spool 12.

In this manner, the flanges 16 provide options during packaging for the types of terminations that will be used in the packaging arrangement 10. Once the packaging has been assembled, the entire arrangement 10 may be placed within an outer box or enclosure during storage or transport. During deployment, the spindle 20 of the packaging arrangement 10 may be placed around a mandrel type device to facilitate rotating the spools 12.

Referring now to FIGS. 8-13, a method of fiber optic cable deployment utilizing a modular cable pulling system 48 that includes a plurality of cable termination elements 32 coupled together using a system of snap-fit carriers 50 for the termination elements 32 is illustrated. The modular cable pulling system 48 illustrated in FIGS. 8-13 is designed such that all of the termination elements 32 and, thus, each of the cables 14 around the spools 12 terminated with the termination elements 32 can be pulled at the same time. The modular cable pulling system 48 defines a plurality of carriers 50 that may be detachably coupled together, wherein each carrier 50 may be designed/structured based on the termination elements 32 used for the cabling to be deployed. According to one example embodiment of a coupling method, the carriers 50 may be snap-fit together. Other methods of mechanical attachment or linkage are certainly possible such as, e.g., a clevis and pinion attachment or an attachment using loops at the ends of the carriers.

Figure 10:
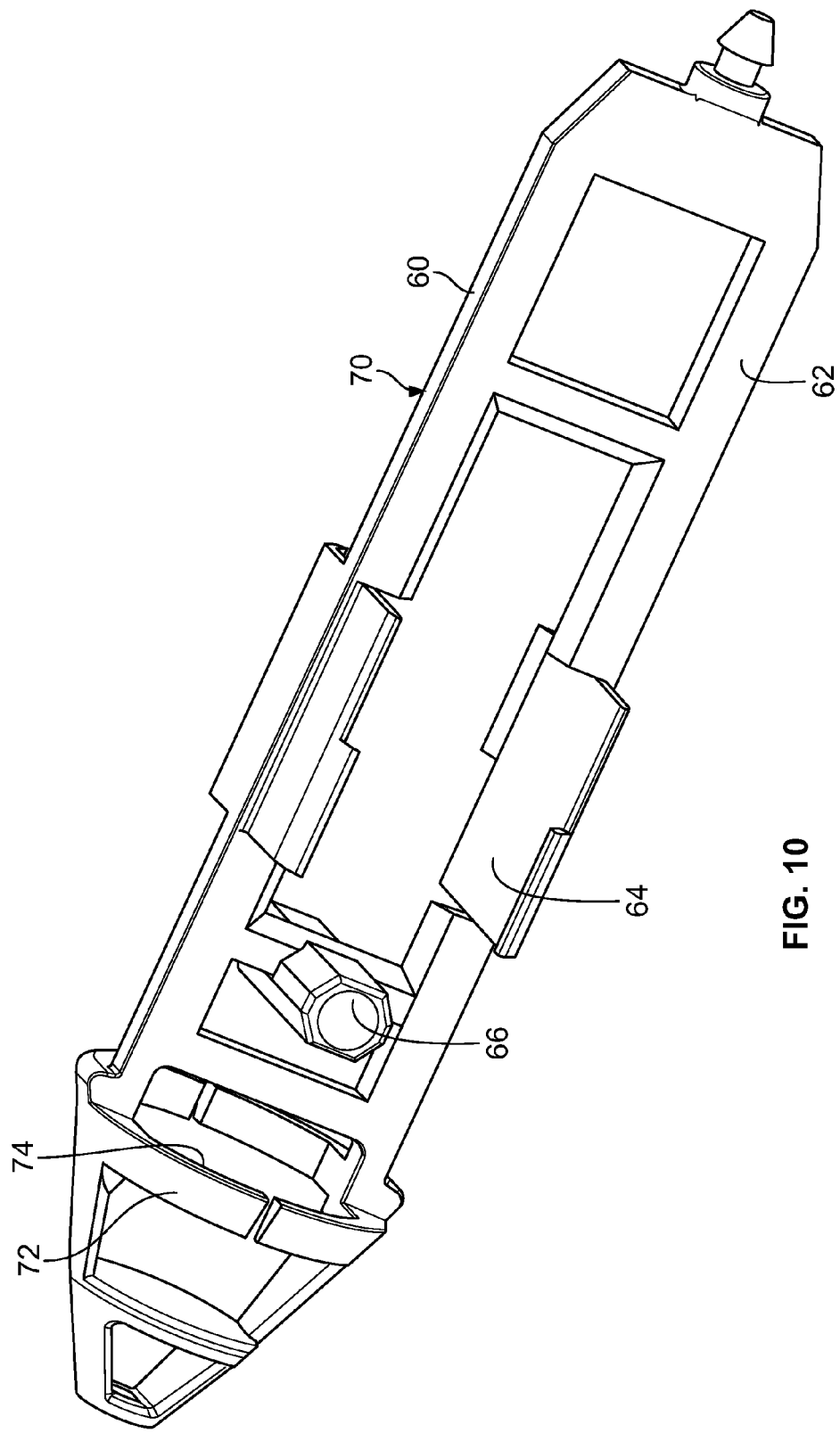
FIG. 10 illustrates the carrier of FIG. 9 in isolation without a cable termination element coupled thereto.

Referring specifically now to FIGS. 8-10, a modular cable pulling system 48 that includes a plurality of carriers 50 carrying cable termination elements 32 in the form of multi-fiber (MPO) type connectors 38 is shown. Each MPO connector 38 is shown as being housed in an associated enclosure 39. The enclosure 39 is adapted for enclosing an end of a fiber optic cable and is used in certain applications to pull the MPO connectors 38 when the MPO connectors 38 are not attached to the carriers 50. The enclosures 39 may be used for pulling connectors such as the MPO connectors 38 through ducts or similar environments in setting up connectivity. The enclosure 39 includes a first member 41 that defines a first cavity that is adapted to receive a portion of the end of the fiber optic cable and further includes a second member 43 that is selectively engaged (e.g., snap-fit) to the first member, the second member 43 defining a second cavity. The enclosure 39 is adapted to transfer a tensile force applied to the enclosure 39 to the strength layer of the fiber optic cable terminated with the MPO connector 38. Further details relating to such cable-pulling enclosures 39 is described and illustrated in U.S. Application Publication No. 2010/0322584, the entire disclosure of which is incorporated herein by reference.

Still referring to FIG. 8, the carriers 50 are illustrated as being daisy-chained together using a snap-fit interlock system, wherein each carrier 50 defines a female snap-fit interlock structure 52 at a first end 54 and a male snap-fit interlock structure 56 at the opposite second end 58. The female and male snap-fit interlock structures 52, 56 may also be referred to as first and second interlock structures, respectively. FIG. 9 illustrates one of the carriers 50 of the modular cable pulling system 48 of FIG. 8 carrying two MPO type connectors 38 in a juxtaposed relationship. In this manner, four carriers 50 attached end to end may be used to unroll eight spools 12 of the packaging arrangement 10. FIG. 10 illustrates the carrier 50 of FIG. 9 in isolation without a cable termination element 32 coupled thereto.

As noted, one of the termination elements 32 that may be terminated to either end of the cable 14 on one of the spools 12 may be a multi-fiber connector 38 in the form of an MPO connector. The MPO connectors, as discussed above, may be enclosed in cable-pulling enclosures 39 when stored around the spools 12. MPO connectors are generally known in the art, and, thus, further details will not be discussed herein. As shown in FIG. 10, each carrier 50 associated with the modular cable pulling system 48 is designed to receive two MPO connector carrying enclosures 39 with a snap fit, wherein the MPO connector carrying enclosures 39 are stacked in a juxtaposed arrangement along their longitudinal axes A.

Each carrier 50 defines a body 60 having the first end 54, the second end 58, and a length L extending therebetween. At the first end 54, the female snap-fit structure 52 is defined. At the second, opposite end 58, the male snap-fit structure 56 that is configured to be coupled to the female snap-fit structure 52 of another carrier 50 is defined. The body 60 of the carrier 50 is configured to carry two MPO connectors 38 that are stacked along their longitudinal axes A. The body 60 defines a first side 62 including opposing flexible cantilever arms 64 and a post 66 protruding therefrom. The flexible cantilevers arms 64 and the post 66 are configured to receive the cable pulling enclosure 39 surrounding the MPO connector 38. The enclosure 39 defines an aperture 68 that is normally used for pulling cables attached to the enclosure 39. The post 66 of the carrier is configured to be inserted into the aperture 68 when coupling the enclosure 39 to the carrier 50. The body 60 defines a second side 70 having a similar configuration as the first side 62 for holding another MPO connector 38 along the same orientation. In the depicted embodiment, the carrier 50 includes a cable management structure 72 adjacent the female snap-fit structure 52. The cable management structure 72 is defined by a partial flexible ring 74 that is configured to retain cabling therewithin and keep the cabling close to the chain formed by the carriers 50.

Figure 13:
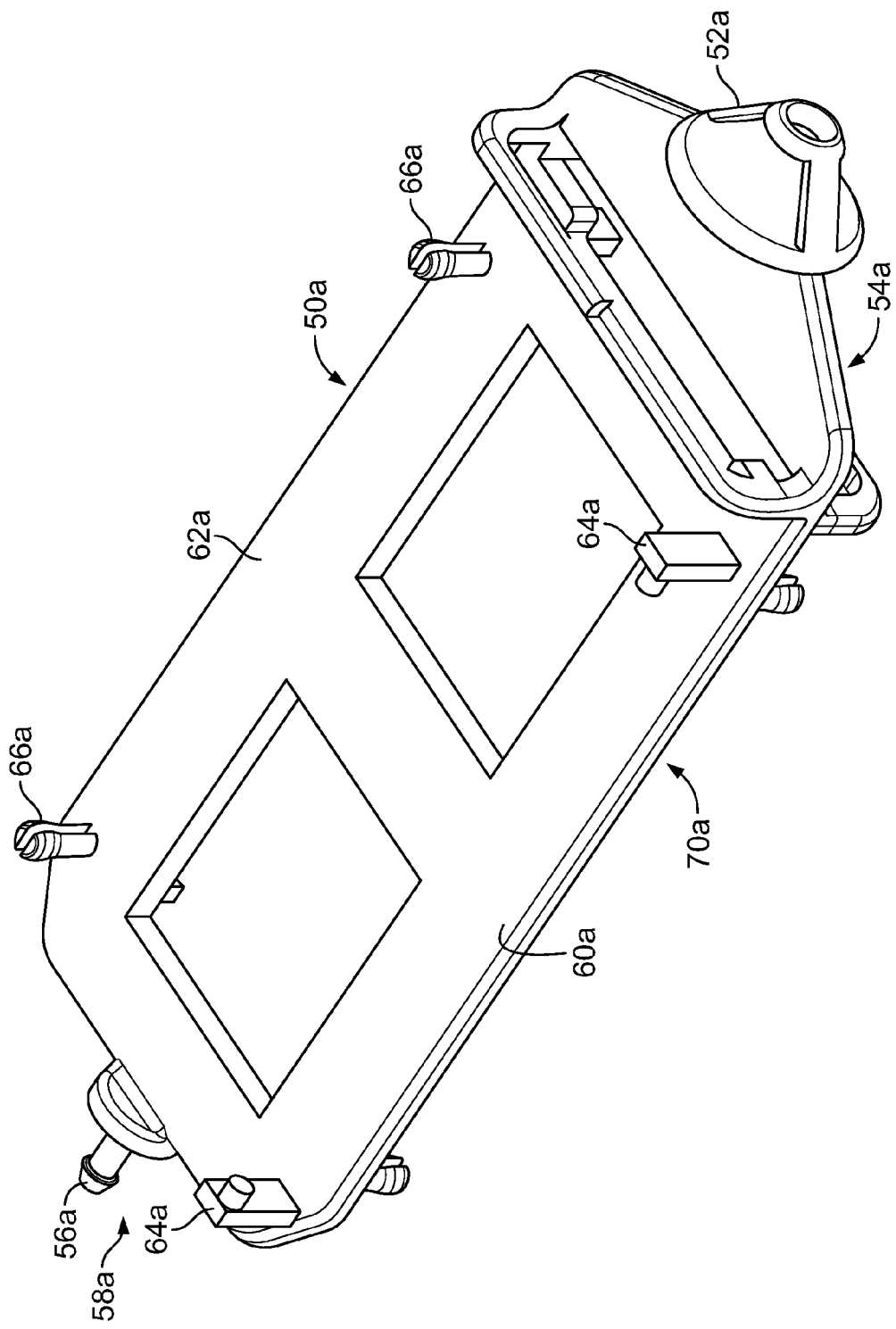
FIG. 13 illustrates one of the carriers of the module cable pulling system of FIGS. 11 and 12, wherein the carrier may be used to carry fiber optic cassettes having SC or LC type adapters as shown in FIGS. 11 and 12.

FIGS. 11-13 illustrate a version of the modular cable pulling system 48a having carriers 50a that are designed for holding fiber optic cassettes 40/40a. The carriers 50a of the cable pulling system 48a define a generally larger footprint than the connector holding carriers 50 of the system 48 of FIGS. 8-10. As shown in FIG. 13, each carrier 50a again defines a first end 54a having a female snap-fit structure 52a and a second opposing end 58a having a male snap-fit structure 56a. As in the carrier 50 of FIGS. 8-10, the carrier 50a is configured to hold two fiber optic cassettes 40/40a in a juxtaposed position. Each carrier 50a defines a first side 62a for carrying one cassette 40/40a and a second side 70a for carrying a second cassette 40/40a. The fiber optic cassette 40 shown in FIG. 11 is configured with SC type fiber optic adapters and the cassette 40a shown in FIG. 12 is configured with LC type fiber optic adapters. The carrier 50a shown in FIG. 13 may be used to carry either type of cassette 40 or 40a. The carriers 50a shown in FIGS. 11-13 also include cable management features 72a similar to those discussed for the version in FIGS. 8-10.

As noted above, the cables 14 that are wound around the deployment packaging arrangement 10 may be terminated with various different telecommunications devices, depending upon the cable used and the connectivity arrangement. The fiber optic cassettes 40/40a shown in FIGS. 11 and 12 are simply two example devices to which the ends of the cabling may be terminated.

Figure 16:
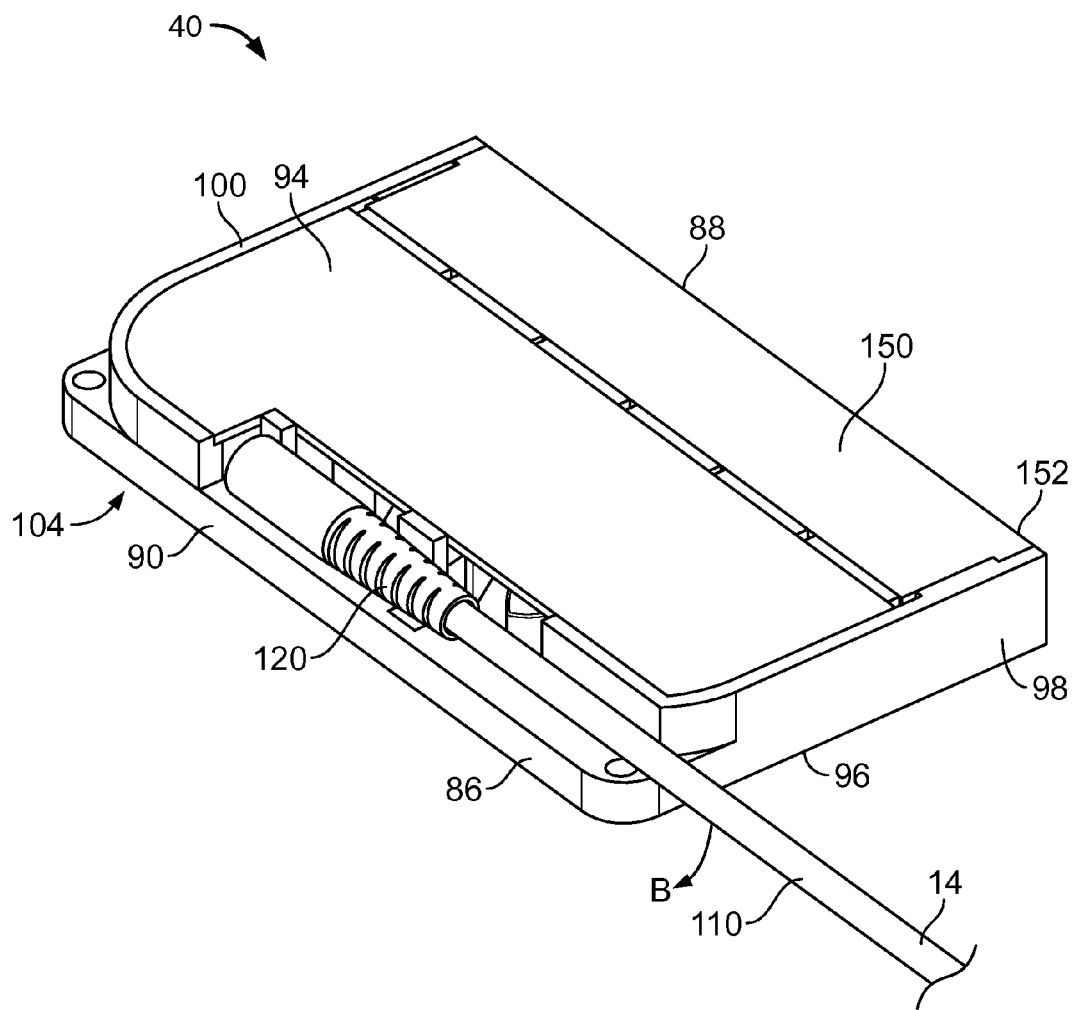
FIG. 16 is a perspective view of an example embodiment of a fiber optic cassette that may be used as a cable termination element within the packaging arrangement of FIG. 1, wherein the fiber optic cassette can be carried by one of the carriers of the modular cable pulling system illustrated in FIGS. 11-12.
Figure 17:
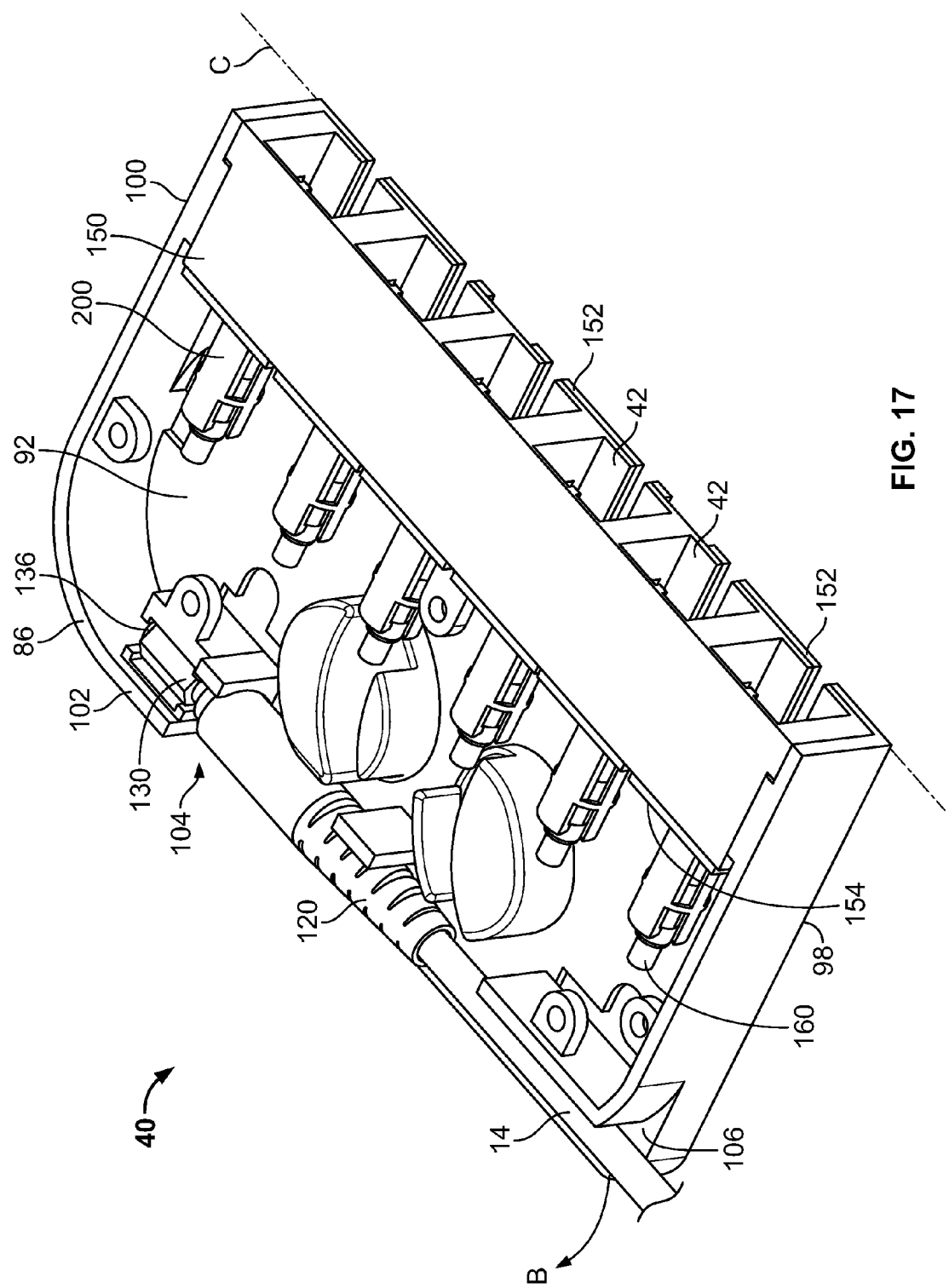
FIG. 17 is a further perspective view of the fiber optic cassette of FIG. 16 with a portion of the body removed to expose an interior of the cassette.
Figure 18:
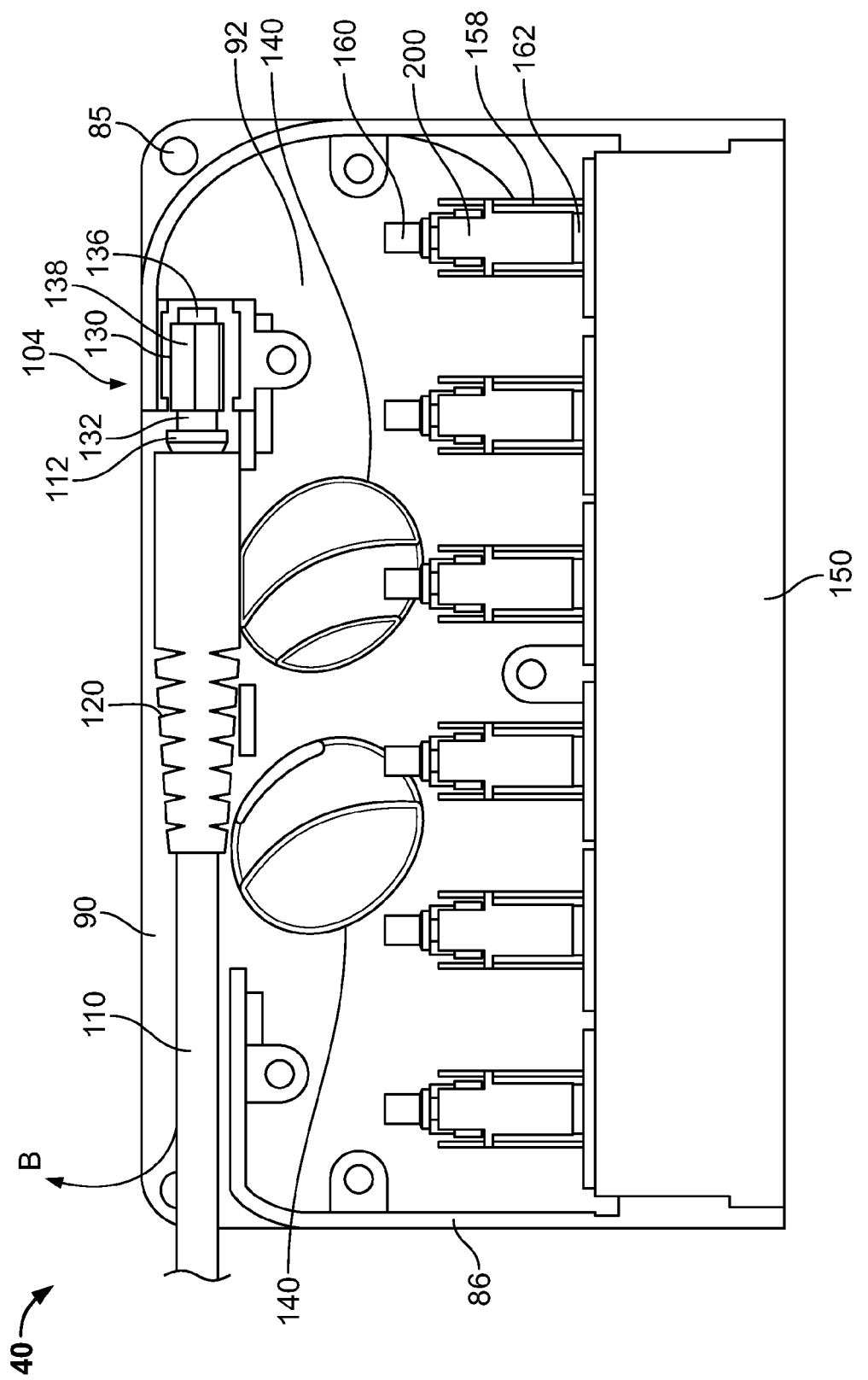
FIG. 18 is a top view of the fiber optic cassette of FIG. 17.

An example of a fiber optic cassette 40 having SC type connection locations (e.g., adapters 42) is illustrated in FIGS. 16-18. It should be noted that the term "connection locations" may refer to any structure used to make a connection for continuing the signal on a cable such as a connector or an adapter used to connect two or more connectors together. As noted above, a cable 14 that is wound around a spool 12 of the packaging arrangement 10 and terminated to the cassette 40 may include multiple fibers and the cassette 40 is designed to separate and route the multiple fibers to connection locations for further connectivity. The cassette 40 includes a body 86 defining a front 88, a rear 90 and an interior 92. Body 86 further includes a top 94, a bottom 96, and sides 98, 100. Cassette body 86 defines a cable entry location 104 which in the illustrated embodiment is along rear 90. In the illustrated embodiment, cable 14 includes an outer jacket 110 and inner strength member 112 around inner fibers. Fibers extend past an end of jacket 110, and an end of strength member 112, and into interior 92 for connection with incoming connectors through the SC adapters 42.

As shown, cabling 14 that is terminated to the cassette 40 may include a boot 120 to provide strain relief at cable entry location 104. Cable 14 can flex away from cassette body 86 in the direction of arrow B, and may be protected from excessive bending by boot 120. Entry 104 is located close to corner 102, so that boot 120 and cable 14 is partially protected at entry 104 by being able to reside in a rear channel 106.

As shown in FIGS. 16-18, fiber optic adapters 42 may define the connections locations of the cassette 40 and may be arranged linearly and positioned along longitudinal axis C of the cassette body 86. In the given embodiment, the cable 14 at cable entry location 104 extends parallel to the longitudinal axis C, although some bending may be permitted relative to the longitudinal axis C.

In general, cassette 40 includes top 94 and bottom 96 which are generally parallel to each other and define the major surfaces of cassette body 86. Sides 98, 100, front 88, and rear 90 define the minor sides of cassette body 86. When the cassettes 40 are placed on the carriers 50a, they are normally juxtaposed such that the minor sides of the bodies 86 are stacked, to minimize the footprint of the carriers 50a. Similarly, if a cassette 40 is being stored within one of the flanges 16 of a spool 12, the cassette 40 may be laid in the storage compartment 30 with a major surface of the body 86 parallel to a flange's major cross-dimension to reduce thicknesses of the flanges 16 needed.

In the illustrated embodiment, adapters 42 are sized to receive front SC connectors. LC connectors can be used with appropriate sized adapters 42a (as shown in the version of FIG. 11).

Cable 14 is connected to cable entry location 104 with a crimp tube 130 and a crimp ring 132 which crimps jacket 110 and strength member 112 to crimp tube 130. A small pocket 136 captures crimp tube 130 for retention with cassette body 86. Pocket captures hex end 138 of crimp tube 130 to retain cable 14 with cassette body 86.

Disposed within interior 92 of cassette body 86 may be a plurality of radius limiters 140 which can provide cable bend radius protection for the fibers disposed within interior 92. Cable radius limiters 140 can be in the form of discrete interior structures, and/or curved exterior surfaces which form around the front 88, rear 90, and sides 98, 100.

In the illustrated embodiment, the adapters 42 are formed in a block construction 150 having a front end 152 and an opposite rear end 154. Front end 152 includes a profile for receiving SC connectors. Front end 152 includes SC clips for clipping to an SC connector. Adapter block 150 also includes a rear clip 158 which clips to a hub and ferrule 160 (hub mounted to ferrule) which terminates each fiber exposed within interior 92 of cassette 40. Hub and ferrule 160 form a rear non-conventional connector 200. A split sleeve 162 is also provided for ferrule alignment between hub and ferrule 160 (rear connector) and the ferrule of the front SC connector.

In such a termination, fibers may be provided with excess length between crimp tube 130 and the rear connectors defined by the termination at hub and ferrule 160. Severe bending of the fibers is to be avoided. In the illustrated embodiment, the small size of the cassette 40 may require that some fibers reverse direction via limiters.

A cassette 40a having LC adapters 42a at the front of the body may be constructed similarly to the SC cassette 40 shown in FIGS. 16-18.

Further details of similar fiber optic cassettes 40/40a are described in U.S. Patent Publication No. 2013/0089292, the entire disclosure of which is incorporated herein by reference.

Referring back to FIGS. 12-13, each carrier 50a that is designed to hold the fiber optic cassettes 40/40a defines a first side 62a and a second side 70a, each side having structures for snap-fitting the cassettes 40/40a. At each side, a pair of posts 66a protrude outwardly that are configured to fit within openings 85 on the cassette body 86. At each side, there is also a pair of flexible arms 64a that are configured to flex in a front to back direction with respect to the body 60a of the carrier 50a in receiving the cassettes 40/40a. As noted above, when the cassettes 40/40a are placed on the carriers 50a, the major dimensions are aligned with the longitudinal axes of the carriers 50a for reducing the overall footprint of the carriers 50a.

With the given modular cable pulling system 48, any number of termination elements 32 such as connectors 38 or cassettes 40/40a may be placed on daisy-chained carriers 50/50a and used to pull the cables 14 at the same time.

Figure 14:
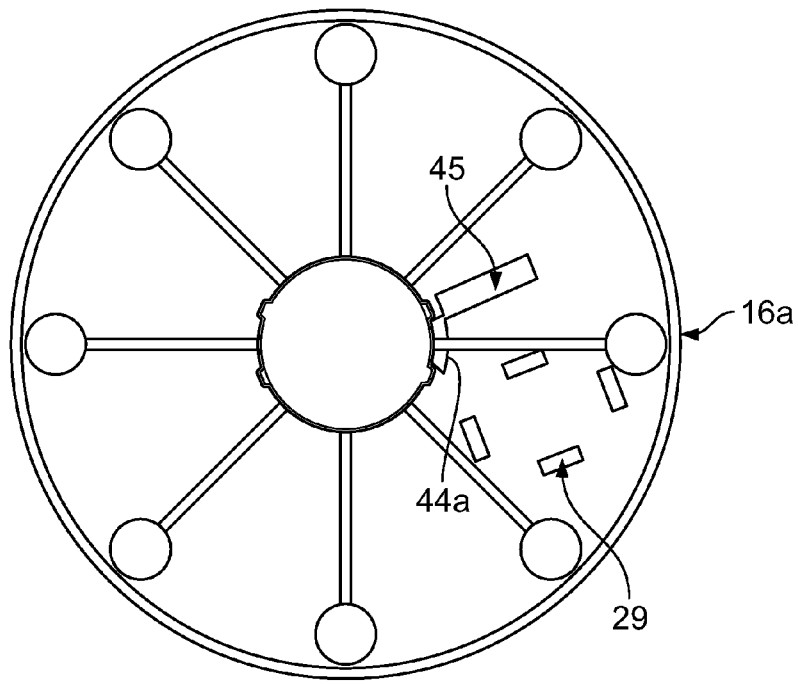
FIG. 14 is another embodiment of a flange that may be used to form the packaging arrangement of FIGS. 1-7.
Figure 15:
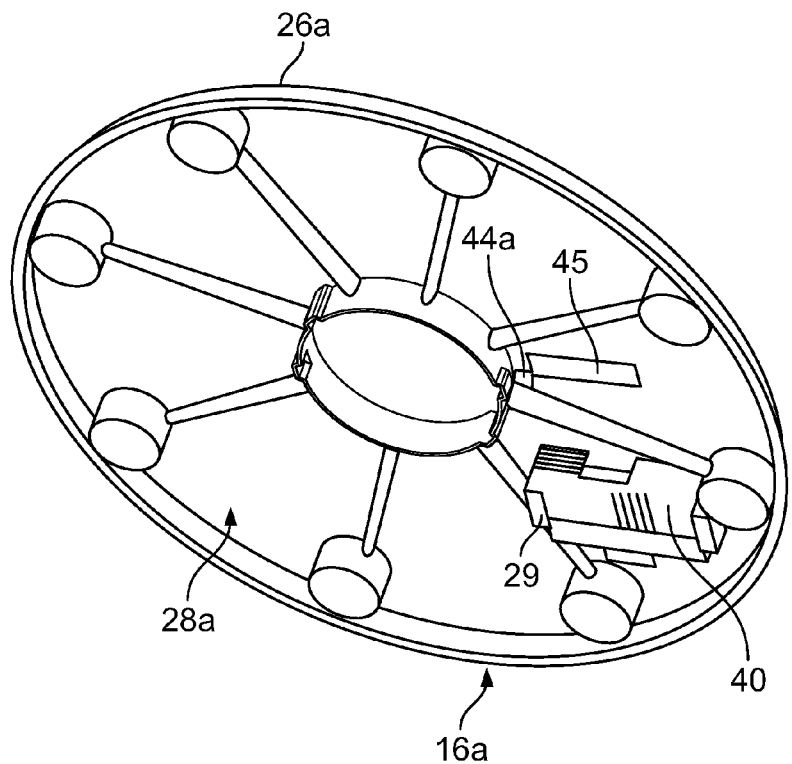
FIG. 15 illustrates the flange with a cable termination element snap-fit thereto.

Now referring to FIGS. 14 and 15, another embodiment of a flange 16a that may be used to form the packaging arrangement 10 of FIGS. 1-7 is illustrated. The flange 16a of FIGS. 14-15 is similar in construction to the flange 16 of FIGS. 3-4 except that instead of including a removable scored area 46 for passing termination elements 32, it defines an opening or a passage 45 large enough to allow a termination element 32 (e.g., a fiber optic cassette 40 in this embodiment) to be pulled through the flange 16*a*. The opening 45 is in addition to the smaller opening 44*a* that allows a normally unterminated cable 14 to pass through. In this manner, if a cable 14 has been preterminated with a fiber optic cassette 40, the cassette 40 can be passed through the opening 45 before cable 14 is wound. And, if the cable 14 is postterminated after the cable end has passed through the cable opening 44*a*, a fiber optic cassette 40 can be passed through the opening 45 from the second side 28*a* to the first side 26*a* after deployment of the cable 14 around the spool.

Also as shown in FIGS. 14-15, the second side 28*a* of the flange 16*a* may include retention features in the form of snap-fit interlock structures 29 for temporarily holding a termination element 32 such as a fiber optic cassette 40 within the storage compartment 30*a*. The snap-fit interlock structures 29 may be defined by cantilevered arms 31. After the cable 14 around a spool has been paid out, the cassette 40 may be removed from the snapfit structures 29 and passed through the opening 45 from the second side 28*a* toward the first side 26*a* in completely removing the cabling from the packaging arrangement 10.

The packaging arrangements 10 described and illustrated herein may be used to store, transport, and deploy various types of telecommunications cables 14, including fiber optic cables. According to one example embodiment, 3.0 mm or 4.0 mm (ruggedized) fiber optic cabling with 6 or 12 fibers may be used. Other embodiments include the use of 1.2 mm, 1.7 mm, or 2.0 mm fiber optic cabling.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A cable deployment system comprising:
   a plurality of carriers detachably coupled together, each carrier including a retention structure for holding a telecommunications device terminated to an end of a telecommunications cable, wherein the carriers are configured to be daisy-chained and pulled together for deployment of cabling attached to each of the carriers at the same time;
   each carrier including a first male interlock structure and a second female interlock structure, wherein the first male interlock structure is configured to be directly interlocked with the second female interlock structure of another one of the carriers without an intermediate structure between the two carriers, allowing the plurality of carriers to be daisy-chained together.

2. A cable deployment system according to claim 1, wherein each carrier is configured to house two telecommunications devices, each terminated to a different telecommunications cable.

3. A cable deployment system according to claim 1, wherein the telecommunications device is a fiber optic connector.

4. A cable deployment system according to claim 3, wherein the fiber optic connector is an MPO connector.

5. A cable deployment system according to claim 1, wherein the telecommunications device is a fiber optic cassette configured to separate out multiple fibers of a fiber optic cable to a plurality of connection locations.

6. A cable deployment system according to claim 5, wherein the connection locations are defined by first fiber optic connectors, each having a ferrule.

7. A cable deployment system according to claim 6, wherein the fiber optic cassette includes fiber optic adapters for connecting the first fiber optic connectors with second fiber optic connectors incoming from an exterior of the cassette.

8. A cable deployment system according to claim 7, wherein the fiber optic adapters are SC adapters.

9. A cable deployment system according to claim 7, wherein the fiber optic adapters are LC adapters.

10. A cable deployment system according to claim 1, wherein the plurality of carriers are coupled together with a snap-fit interlock.

* * * * *